United States Patent
Kamen et al.

(10) Patent No.: US 12,444,054 B2
(45) Date of Patent: Oct. 14, 2025

(54) LOCALIZATION AND CLASSIFICATION OF ABNORMALITIES IN MEDICAL IMAGES

(71) Applicant: Siemens Healthineers AG, Forchheim (DE)

(72) Inventors: Ali Kamen, Skillman, NJ (US); Bin Lou, Princeton Junction, NJ (US); Bibo Shi, Monmouth Junction, NJ (US); Nicolas Von Roden, St Gallen (CH); Berthold Kiefer, Erlangen (DE); Robert Grimm, Nuremberg (DE); Heinrich von Busch, Uttenreuth (DE); Mamadou Diallo, Plainsboro, NJ (US); Tongbai Meng, Ellicott City, MD (US); Dorin Comaniciu, Princeton, NJ (US); David Jean Winkel, Basel (CH); Xin Yu, Nashville, TN (US)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 19/058,065

(22) Filed: Feb. 20, 2025

(65) Prior Publication Data

US 2025/0232445 A1     Jul. 17, 2025

Related U.S. Application Data

(63) Continuation of application No. 18/166,128, filed on Feb. 8, 2023, which is a continuation of application (Continued)

(51) Int. Cl.
*G06T 7/00*     (2017.01)
*G06F 18/214*     (2023.01)
(Continued)

(52) U.S. Cl.
CPC .......... *G06T 7/0014* (2013.01); *G06F 18/214* (2023.01); *G06F 18/2411* (2023.01);
(Continued)

(58) Field of Classification Search
CPC ............. G06T 7/0012; G06T 7/11; G06T 2207/10088; G06T 2207/20081;
(Continued)

(56) References Cited

U.S. PATENT DOCUMENTS

| | | | |
|---|---|---|---|
| 8,204,315 B2 * | 6/2012 | Madabhushi | G06V 10/426 382/128 |
| 10,424,087 B2 | 9/2019 | Risser et al. | |

(Continued)

OTHER PUBLICATIONS

Sachin Mehta et al: "Y-Net: Joint Segmentation and Classification for Diagnosis of Breast Biopsy Images", Jun. 4, 2018, pp. 1-9 (Year: 2018).*

(Continued)

*Primary Examiner* — Van D Huynh

(57) ABSTRACT

Systems and methods are provided for optimizing a deep learning model. A multi-site dataset associated with different clinical sites and a deployment dataset associated with a deployment clinical site are received. A deep learning model is trained based on the multi-site dataset. The trained deep learning model is optimized based on the deployment dataset. The optimized trained deep learning model is output.

30 Claims, 13 Drawing Sheets

Related U.S. Application Data

No. 17/809,385, filed on Jun. 28, 2022, now Pat. No. 11,610,308, which is a continuation of application No. 15/733,778, filed as application No. PCT/EP2019/065447 on Jun. 13, 2019, now Pat. No. 11,403,750.

(60) Provisional application No. 62/687,294, filed on Jun. 20, 2018, provisional application No. 62/684,337, filed on Jun. 13, 2018.

(51) Int. Cl.
```
G06F 18/2411      (2023.01)
G06N 20/00        (2019.01)
G06T 7/11         (2017.01)
G06V 10/26        (2022.01)
G06V 10/44        (2022.01)
G06V 10/764       (2022.01)
G06V 10/82        (2022.01)
```

(52) U.S. Cl.
CPC .......... *G06N 20/00* (2019.01); *G06T 7/0012* (2013.01); *G06T 7/11* (2017.01); *G06V 10/26* (2022.01); *G06V 10/454* (2022.01); *G06V 10/764* (2022.01); *G06V 10/82* (2022.01); *G06T 2207/10088* (2013.01); *G06T 2207/20081* (2013.01); *G06T 2207/20084* (2013.01); *G06T 2207/30096* (2013.01)

(58) Field of Classification Search
CPC . G06T 2207/20084; G06T 2207/30096; G06T 7/0014; G06K 9/6256; G06K 9/6269; G06K 9/34; G06K 9/6271; G06K 9/4628; G06N 20/00
See application file for complete search history.

(56) References Cited

U.S. PATENT DOCUMENTS

| | | | |
|---|---|---|---|
| 10,445,910 B2 | 10/2019 | Tanaka et al. | |
| 11,295,165 B1 | 4/2022 | Agarwal et al. | |
| 2016/0232425 A1* | 8/2016 | Huang | G06F 18/253 |
| 2016/0239969 A1 | 8/2016 | Davatzikos et al. | |
| 2017/0333521 A1* | 11/2017 | Hulme | C07K 14/195 |
| 2018/0144465 A1 | 5/2018 | Hsieh et al. | |
| 2018/0144466 A1 | 5/2018 | Hsieh et al. | |
| 2018/0240233 A1* | 8/2018 | Kiraly | G06T 7/0012 |
| 2019/0156477 A1* | 5/2019 | Perrin | G06T 7/0012 |
| 2019/0266436 A1 | 8/2019 | Prakash et al. | |
| 2019/0287283 A1 | 9/2019 | Lin et al. | |
| 2019/0304092 A1 | 10/2019 | Akselrod-Ballin et al. | |
| 2019/0340470 A1 | 11/2019 | Hsieh et al. | |
| 2019/0355102 A1 | 11/2019 | Lin et al. | |
| 2021/0217524 A1* | 7/2021 | Vos | G16H 50/20 |
| 2021/0249142 A1 | 8/2021 | Lau et al. | |

OTHER PUBLICATIONS

Ghafoorian et al., "Transfer Learning for Domain Adaptation in MRI: Application in Brain Lesion Segmentation", International Conference on Medical Image Computing and Computer-Assisted Intervention, Springer Cham, Feb. 25, 2017,8pgs (Year: 2017).*
Siegel et al., "Cancer Statistics, 2017", Ca: A Cancer Journal for Clinicians, vol. 67, No. 1, Jan./Feb. 2017, pp. 7-30.
Chung et al., "Discovery Radiomics for Multi-Parametric MRI Prostate Cancer Detection", Computer Vision and Pattern Recognition, Oct. 20, 2015, 8 pgs.
Reda et al., "Computer-Aided Diagnostic Tool for Early Detection of Prostate Cancer", IEEE International Conference on Image Processing, Sep. 2016, pp. 2668-2672.
Wang et al., "Computer Aided-Diagnosis of Prostate Cancer on Multiparametric Mri: A Technical Review of Current Research", BioMed Research International, vol. 2014, 11 pgs.
Wang et al., "Automated Detection of Clinically Significant Prostate Cancer in mp-MRI Images Based on an End-to-End Deep Neural Network", IEEE Transactions on Medical Imaging, vol. 37, Issue 5, May 2018, pp. 1127-1139.
Lin et al., "Bilinear CNN Models for Fine-Grained Visual Recognition", Proceedings of the IEEE International Conference on Computer Vision, 2015, pp. 1449-1457.
Havaei et al., "HeMIS: Hetero-Modal Image Segmentation", International Conference on Medical Image Computing and Computing and Computer-Assisted Intervention, Jul. 18, 2016, 11 pgs.
He et al., "Delving Deep into Rectifiers: Surpassing Human-Level Performance on ImageNet Classification", Proceedings of the IEEE International Conference on Computer Vision, Feb. 6, 2015, 11 pgs.
Litjens et al., "A Survey on Deep Learning in Medical Image Analysis", Medical Image Analysis 42, 2017, pp. 50-88.
Shen et al., "Deep Learning in Medical Image Analysis", Annual Review of Biodmedical Engineering, Jun. 21, J017, pp. 221-248.
Shin et al., "Deep Convolutional Neural Networks for Computer-Aided Detection: CNN Architectures, Dataset Characteristics and Transfer Learning", IEEE Transactions on Medical Imaging, vol. 35, No. 5, May 2016, pp. 1285-1298.
Heckman et al., "Sample Selection Bias as a Specification Error", Econometrica, vol. 47, No. 1, 1979, pp. 153-161.
Mazzara et al., "Brain Tumor Target vol. Determination for Radiation Treatment Planning Through Automated MRI Segmentation", International Journal of Radiation Oncology, Physics, vol. 59, No. 1, 2004, pp. 300-312.
Kouw et al., "A Review of Single-Source Unsupervised Domain Adaption", arXiv:1901.05335v1; Jan. 16, 2019, 18 pgs.
Wang et al., "Deep Visual Domain Adaptation: A Survey", Neurocomputing, 2018, 17 pgs.
Sun et al., "A Survey of Multi-Source Domain Adaption", Information Fusion 24, 2015, pp. 84-92.
Patel et al., "Visual Domain Adaption: A Survey of Recent Advances", IEEE Signal Processing Magazine, vol. 32, Issue 3, 2015, pp. 53-69.
Van Opbroek, et al., "Transfer Learning Improves Supervised Image Segmentation Across Imaging Protocols", IEEE Transactions on Medical Imaging, Nov. 2014, 14 pgs.
Tajbakhsh et al., "Convolutional Neural Networks for Medical Image Analysis: Full Training or Fine Tuning", IEEE Transactions on Medical Imaging, vol. 35, Issue 5, 2016, pp. 1299-1312.
Ghafoorian et al., "Transfer Learning for Domain Adaptation in MRI: Application in Brain Lesion Segmentation", International Conference on Medical Image Computing and Computer-Assisted Intervention, Springer Cham, Feb. 25, 2017, 8 pgs.
Valindria et al., "Domain Adaption for MRI Organ Segmentation using Reverse Classification Accuracy", rXiv:1806.00363v1, Jun. 1, 2018, 9 pgs.
Mahmood et al., "Unsupervised Reverse Domain Adaptation for Synthetic Medical Images via Adversarial Training", IEEE Transactions on Medical Imaging, Nov. 29, 2017, 10 pgs.
Bengio et al., "Curriculum Learning", Proceedings of the 26th Annual International Conference on Machine Learning, ACM, 2009, 8 pgs.
Pi et al., "Self-Paced Boost Learning for Classification", Proceedings of the 25th International Joint Conference on Artificial Intelligence, 2016, 7 pgs.
Lambin et al., "Radiomics: Extracting More Information from Medical Images Using Advanced Feature Analysis", European Journal of Cancer, 2012, pp. 441-446.
Pearson, "On lines and planes of closest fit to systems of points in space", Jun. 8, 2010, The London, Edinburgh, and Dublin Philosophical Magazine and Journal of Science, 2:11, 559-572, DOI: 10.1080/14786440109462720.
Fisher, "The Use of Multiple Measurements in Taxonomic Problems", Annals of Eugenics, 1936, 10 pgs.
Scholkopf, "Nonlinear Component Analysis as a Kernel Eigenvalue Problem", Neural Computation, 1998, 21 pgs.

(56) References Cited

OTHER PUBLICATIONS

Baudat et al., "Generalized Discriminant Analysis Using a Kernel Approach", Neural Computation, vol. 12, Issue 10, Oct. 2000, pp. 2385-2404.
Tenenbaum et al., "A Global Geometric Framework for Nonlinear Dimensionality Reduction", Science, vol. 290, Dec. 22, 2000, pp. 2319-2323.
Roweis et al., "Nonlinear Dimensionality Reduction by Locally Linear Embedding", Science, vol. 290, Dec. 22, 2000, pp. 2323-2326.
Hinton et al., "A Fast Learning Algorithm for Deep Belief Nets", Neural Computation 18, 2006, pp. 1527-1554.
Hinton et al., "Reducing the Dimensionality of Data with Neural Networks", Science, Jul. 28, 2006, vol. 313, Issue 5786, pp. 504-507.
Mcculloch et al., "A Logical Calculus of the Ideas Immanent in Nervous Activity", Bulletin of Mathematical Biphysics, vol. 5, 1943, pp. 115-133.
Zhong et al., "An Overview on Data Representation Learning: From Traditional Feature Learning to Recent Deep Learning", Journal of Finance and Data Science, Nov. 25, 2016, 21 pgs.
Efros et al., "Texture Synthesis by Non-Parametric Sampling", 1999, IEEE, 6 pgs.
Xu et al., "Image Inpainting by Patch Propagation Using Patch Sparsity", IEEE Transactions on Image Processing, vol. 19, No. 5, May 2010, pp. 1153-1165.
Radford et al., "Unsupervised Representation Learning with Deep Convolutional Generative Adversarial Networks", ICLR, Nov. 19, 2015, 15 pgs.
Sachin Mehta et al., "Y-Net: Joint Segmentation and Classification for Diagnosis of Breast Biopsy Images", Jun. 4, J018, pp. 1-9.
International Search Report mailed Nov. 25, 2019 in connection with International Patent Application No. PCT/EP/2019/065447, 5 pgs.
Chen et al., "Fully automatic acute ischemic lesion segmentation in DWI using convolutional neural networks", NeuroImage: Clinical, 2017, pp. 633-643.

* cited by examiner

Receive an input medical image depicting an abnormality
502

↓

Delete different portions of the input medical image to generate a plurality of incomplete images
504

↓

Generate a plurality of synthesized images using a trained generative adversarial network
506

↓

Determine a normal image from the plurality of synthesized images
508

↓

Detect the abnormality in the input medical image based on the input medical image and the normal image
510

↓

Output a localization map of the detected abnormality
512

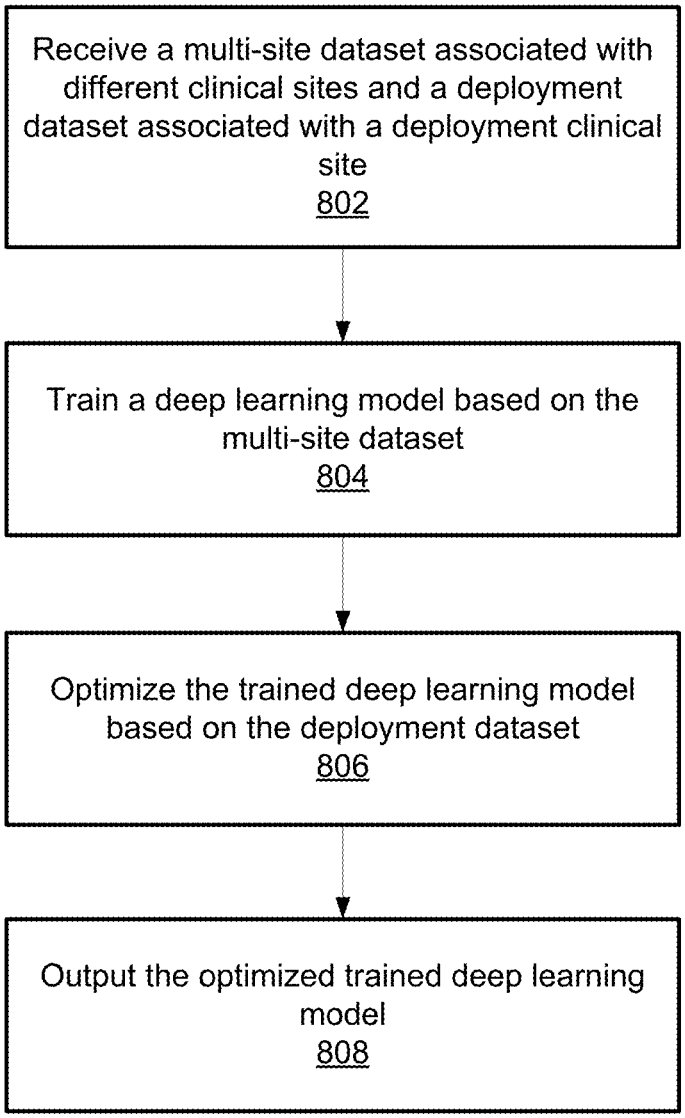

Receive 1) the multi-site dataset comprising a first dataset and a second dataset and 2) a pretrained deep learning model pretrained on the first dataset
902

Reorder sub-datasets of the second dataset based on a similarity between the first dataset and each of the plurality of sub-datasets of the second dataset
904

Determine a trained deep learning model based on the pretrained deep learning model and the reordered plurality of sub-datasets
906

Output the trained deep learning model
908

1002 — Given inputs of datasets $D_S$ and $D_M$ and a pretrained deep learning model $\theta_0$ pretrained on $D_S$, where a cross-validation performance of the pretrained deep learning model $\theta_0$ pretrained is denoted as $P_0^{train}$ and a cross-validation performance of a deep learning model trained using $D_S$ and $D_M$ is denoted as $P_1^{train}$;

1004

1006 — Reorder $D_M = \{D_{m1}, ..., D_{mj}\}_{j=1}^{J}$ based on a similarity measure $S(D_S, D_{mj})$ to provide $\tilde{D}_m$;

For $i = 1, ..., j$, where $\theta_i$ is initially set to $\theta_0$:

Update deep learning model $\theta_i$ on the most similar sub-dataset in dataset $\tilde{D}_{mi}$ to provide updated deep learning model $\tilde{\theta}_i$ by:

Calculate $P_i^{train}$ based on $\tilde{\theta}_i$;

If $P_i^{train} \geq P_0^{train}$ and $P_i^{train} \geq P_1^{train}$, then $\theta_{i+1} = \tilde{\theta}_i$ and $i = i + 1$;

Else $\theta_{i+1} = \theta_i$ and $i = i + 1$;

Receive 1) an annotated deployment dataset of the deployment dataset and 2) a trained deep learning model trained on the multi-site dateset
1102

Reorder the annotated deployment dataset based on an uncertainty
1104

Optimize the trained deep learning model based on the trained deep learning model and the reordered annotated deployment dataset
1106

Output the optimized trained deep learning model
1108

1202 — Given inputs of annotated deployment dataset $D_{dl}$ and a trained deep learning model $\tilde{\theta}^{train}$ selectively trained on $D_S \cup D_M$, where a cross-validation performance of the trained deep learning model $\tilde{\theta}^{train}$ is denoted as $P_j^{train}$ and a cross-validation performance of a deep learning model trained using $D_{dl}$ is denoted as $P_0^{deploy}$;

1204 — Reorder $D_{dl} = \{(x_i^{dl}, y_i^{dl})\}_{i=1}^{Ndl}$ based on an uncertainty measure $U(D_{dl}, \tilde{\theta}^{train})$ to provide $\tilde{D}_{dl}$;

1206 — For $i = 1, \ldots, k$, where $\theta_i$ is initially set to $\tilde{\theta}^{train}$:

Refine deep learning model $\theta_i$ for the most certain and uncertain samples from $\tilde{D}_{dl}$ to provide refined deep learning model $\tilde{\theta}_i$ by:

Calculate $P_i^{train}$ and $P_i^{deploy}$ based on $\tilde{\theta}_i$;

If $P_i^{train} \geq P_j^{train} - \epsilon$ and $P_i^{deploy} \geq P_0^{deploy}$, then $\theta_{i+1} = \tilde{\theta}_i$ and $i = i + 1$;

Else $\theta_{i+1} = \theta_i$ and $i = i + 1$;

LOCALIZATION AND CLASSIFICATION OF ABNORMALITIES IN MEDICAL IMAGES

CROSS-REFERENCE TO RELATED APPLICATIONS

This application is a continuation of U.S. Patent Application No. 18/166,128, filed Feb. 8, 2023, which is a continuation of U.S. patent application Ser. No. 17/809,385, filed Jun. 28, 2022 and issued as U.S. Pat. No. 11,610,308, which is a continuation of U.S. patent application Ser. No. 15/733,778, filed Oct. 23, 2020 and issued as U.S. Pat. No. 11,403,750, which is a national stage (under 35 U.S.C. 371) of International Patent Application No. PCT/EP2019/065447, filed Jun. 13, 2019, which claims the benefit of U.S. Provisional Application No. 62/684,337, filed Jun. 13, 2018, and U.S. Provisional Application No. 62/687,294, filed Jun. 20, 2018, the disclosures of which are herein incorporated by reference in their entirety.

TECHNICAL FIELD

The present invention relates generally to localization and classification of abnormalities in medical images, and more particularly to localization and classification of abnormalities in medical images using a jointly trained localization network and classification network.

BACKGROUND

Currently, medical imaging technology is able to provide detailed views of the anatomy, various physiological processes, and metabolic activities within the human body in a non-invasive manner. However, with the increasing resolutions of medical images, the variety in the contrasts of medical images, and the use of multi-modal imaging, it is becoming prohibitively time-consuming for radiologists to evaluate medical images to identify abnormalities such as, e.g., fractions, bleeding, and lesions. Furthermore, the variety of abnormalities and how they manifest in the medical images make it difficult for radiologists to learn how to identify abnormalities in the medical images.

One exemplary medical imaging technology is multi-parametric magnetic resonance imaging (mpMRI), which has been proposed for the non-invasive diagnosis, localization, risk stratification, and staging of prostate cancer. An mpMRI image combines a number (e.g., 8 or more) of individual images acquired under different imaging protocols. Accordingly, a comprehensive assessment of an mpMRI image can be tedious for daily clinical readings. Further, subtle and collective signatures of cancerous lesions within the mpMRI image are difficult to detect consistently.

BRIEF SUMMARY OF THE INVENTION

In accordance with one or more embodiments, systems and methods are provided for optimizing a deep learning model. A multi-site dataset associated with different clinical sites and a deployment dataset associated with a deployment clinical site are received. A deep learning model is trained based on the multi-site dataset. The trained deep learning model is optimized based on the deployment dataset. The optimized trained deep learning model is output.

These and other advantages of the invention will be apparent to those of ordinary skill in the art by reference to the following detailed description and the accompanying drawings.

BRIEF DESCRIPTION OF THE DRAWINGS

FIG. 5 shows a method for detecting an abnormality in a medical image, in accordance with one or more embodiments;

FIG. 8 shows a method for training a deep learning model based on a multi-site dataset, in accordance with one or more embodiments;

FIG. 9 shows a method for training a deep learning model based on a multi-site dataset, in accordance with one or more embodiments;

FIG. 10 shows an algorithm for training a deep learning model based on a multi-site dataset, in accordance with one or more embodiments;

FIG. 11 shows a method for optimizing a trained deep learning model based on a deployment dataset, in accordance with one or more embodiments FIG. 12 shows an algorithm for optimizing a trained deep learning model based on a multi-site dataset, in accordance with one or more embodiments.

DETAILED DESCRIPTION

The present invention generally relates to localization and classification of abnormalities in medical images. Embodiments of the present invention are described herein to give a visual understanding of methods for localization and classification of abnormalities in medical images. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Further, it should be understood that while the embodiments discussed herein may be discussed with respect to the localizing and classifying of lesions on a prostate in medical images, the present invention is not so limited. For example, embodiments of the present invention may be applied to localize and classify lesions, or any other type of abnormality (e.g., fractions, bleeding, etc.), located on any anatomical structure (e.g., lungs, kidney, brain, spinal cord, etc.). Embodiments of the present invention may be applied for any type of abnormality located on any type of structure from any type of image.

Figure 6:
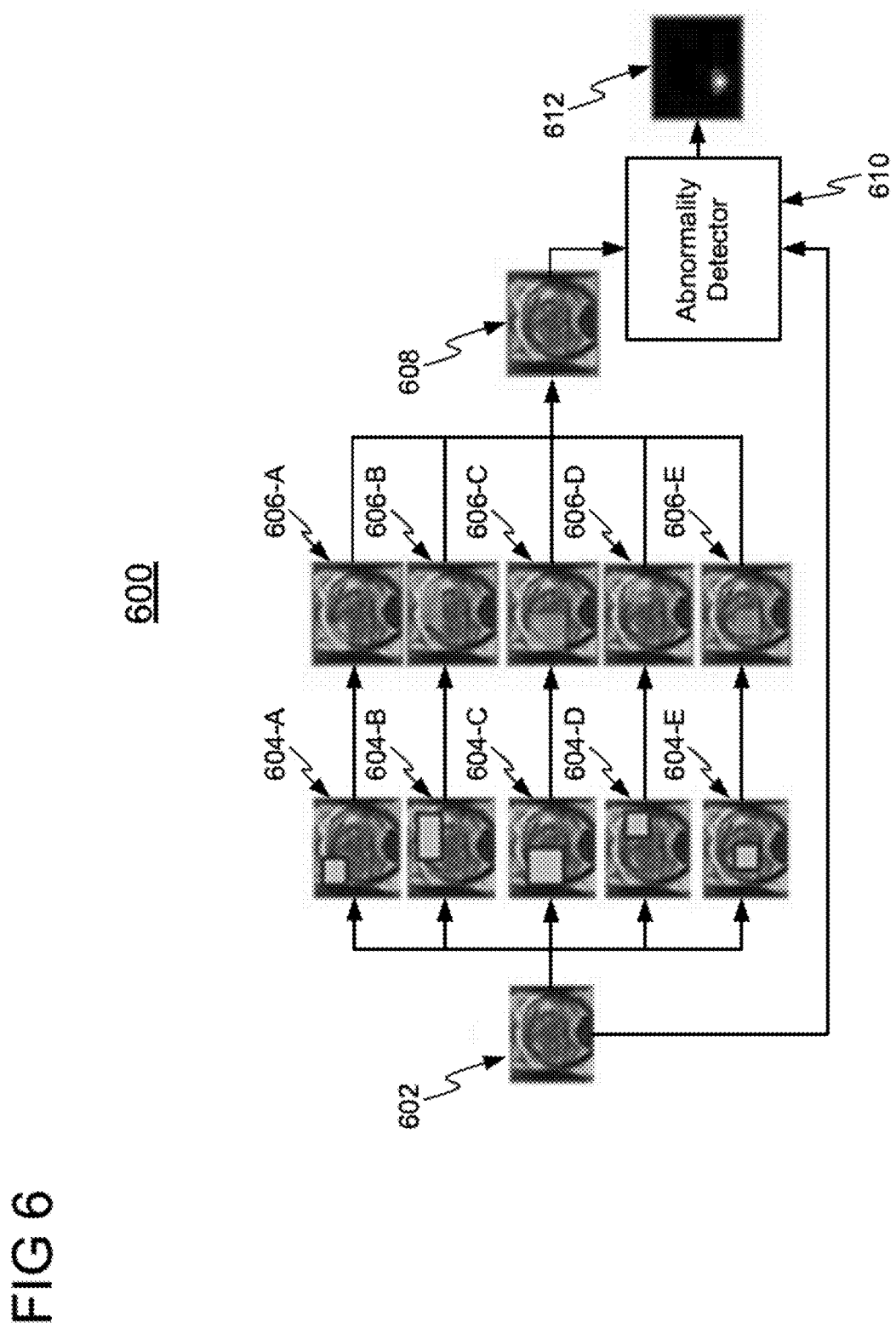
FIG. 6 shows a workflow for detecting an abnormality in a medical image, in accordance with one or more embodiments.

Embodiments of the present invention provide for localizing and classifying abnormalities in medical images. Such abnormalities may include, for example, fractions, bleeding, lesions, or any other abnormality. In one embodiment, systems and methods are described for localizing and classifying lesions in a medical image using a jointly trained localization network and classification network, as described below with respect to FIGS. 1-4. In another embodiment, systems and methods are described for localizing an abnormality in a medical image by comparing the medical image with a synthesized normal (i.e., healthy) image, as described below with respect to FIGS. 5-7. In yet another embodiment, systems and methods are described for optimizing a deep learning model, such as, e.g., any of the deep learning models disclosed herein, using multi-site datasets, as described below with respect to FIGS. 8-12. It should be understood that references to various embodiments herein may refer to features of a same embodiment or to different embodiments, and that features described with reference to a particular embodiment should not be interpreted as being limited to that particular embodiment.

Figure 1:
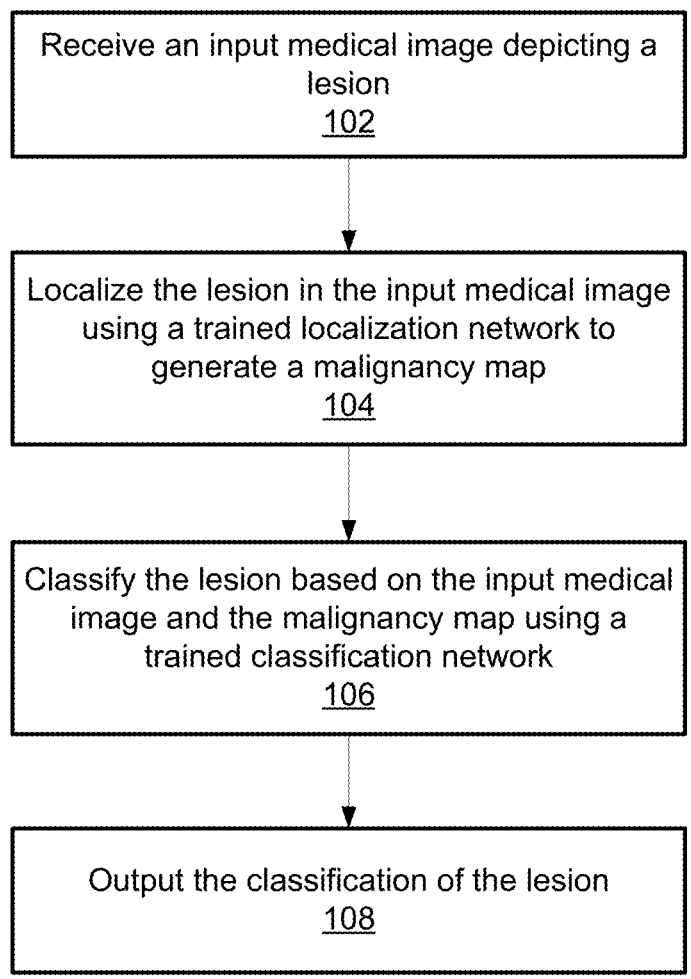
FIG. 1 shows a method for localizing and classifying lesions in a medical image, in accordance with one or more embodiments.

In accordance with one embodiment, systems and methods are provided for localizing and classifying lesions (e.g., for prostate cancer) from a medical image according to the steps of method 100 of FIG. 1. Conventional approaches for detecting and classifying lesions involve several separate steps, each of which is optimized individually without considering the error tolerance of the other steps. As a result, such conventional approaches either involve unnecessary computational cost or suffer from errors accumulated over the steps. Advantageously, embodiments of the present invention provide for a localization network for localizing legions and a classification network for classifying lesions jointly trained in a multi-phase training procedure.

FIG. 1 shows a method 100 for localizing and classifying lesions (or any other abnormality) in a medical image, in accordance with one or more embodiments. Method 100 may be performed by any suitable computing device, such as, e.g., computer 1302 of FIG. 13.

At step 102, one or more input medical images depicting a lesion are received. In one embodiment, the medical image is a magnetic resonance imaging (MRI) image, however it should be understood that the medical image may be of any suitable modality, such as, e.g., multi-parametric MRI (mpMRI), DynaCT, x-ray, ultrasound (US), single-photon emission computed tomography (SPECT), positron emission tomography (PET), etc. The medical image may be of any suitable dimensionality, such as, e.g., 2D (e.g., a 2D slice of an MRI image), 2.5D, or 3D. While the input medical image is described as depicting a lesion, it should be understood that the input medical image may depict any other abnormality, such as, e.g., fractions or bleeding. In one embodiment, the input medical image comprises multiple 2.5D neighboring images.

The medical image may be received directly from an image acquisition device used to acquire the input medical image. Alternatively, the input medical image may be received by loading a previously acquired medical image from a storage or memory of a computer system or receiving a medical image that has been transmitted from a remote computer system.

At step 104, the lesion in the input medical image is localized using a trained localization network to generate a localization map. The localization map may be of any suitable form. In one embodiment, the localization map is a pixelwise binary heat map having an intensity value of 1 to represent pixels where the lesion is located and an intensity value of 0 to represent pixels where the lesion is not located. In another embodiment, the localization map is a pixelwise probability heat map having an intensity value ranging from 0 to 1 (inclusive) representing a probability that a pixel represents a lesion. A Gaussian blur may be placed around a center of the lesion in the heat map.

The trained localization network may be any suitable machine learning network trained to localize the lesion in the input medical image, such as, e.g., an encoder-decoder neural network. The network architecture of the trained localization network is described in further detail below with respect to FIG. 2 in accordance with one embodiment.

At step 106, the lesion is classified based on the input medical image and the localization map using a trained classification network. In one embodiment, the classification is a binary classification of the lesion, such as, e.g., malignant or not malignant (i.e., benign) or benign or not benign (i.e., malignant), however the classification may be of any suitable form. The trained classification network may be any suitable machine learning network trained to classify the lesion in the input medical image, such as, e.g., a neural network. The network architecture of the trained classification network is described in further detail below with respect to FIG. 2 in accordance with one embodiment.

In one embodiment, a multi-task network comprises the trained localization network and the trained classification network. In this manner, the multi-task network may be trained in a multi-phase training procedure to jointly train the localization network and the classification network. In a first training phase, the localization network is individually and separately trained to determine a localization loss. In a second training phase, weights of the localization network are frozen and the classification network is trained to determine a classification loss. The network architecture of the multi-task network is described in further detail below with respect to FIG. 2 in accordance with one embodiment.

At step 108, the classification of the lesion is output. For example, the classification of the lesion can be output by displaying the classification of the lesion on a display device of a computer system (computer 1302 of FIG. 13), storing the classification of the lesion on a memory or storage of a computer system (computer 1302 of FIG. 13), or by transmitting the classification of the lesion to a remote computer system.

Figure 2:
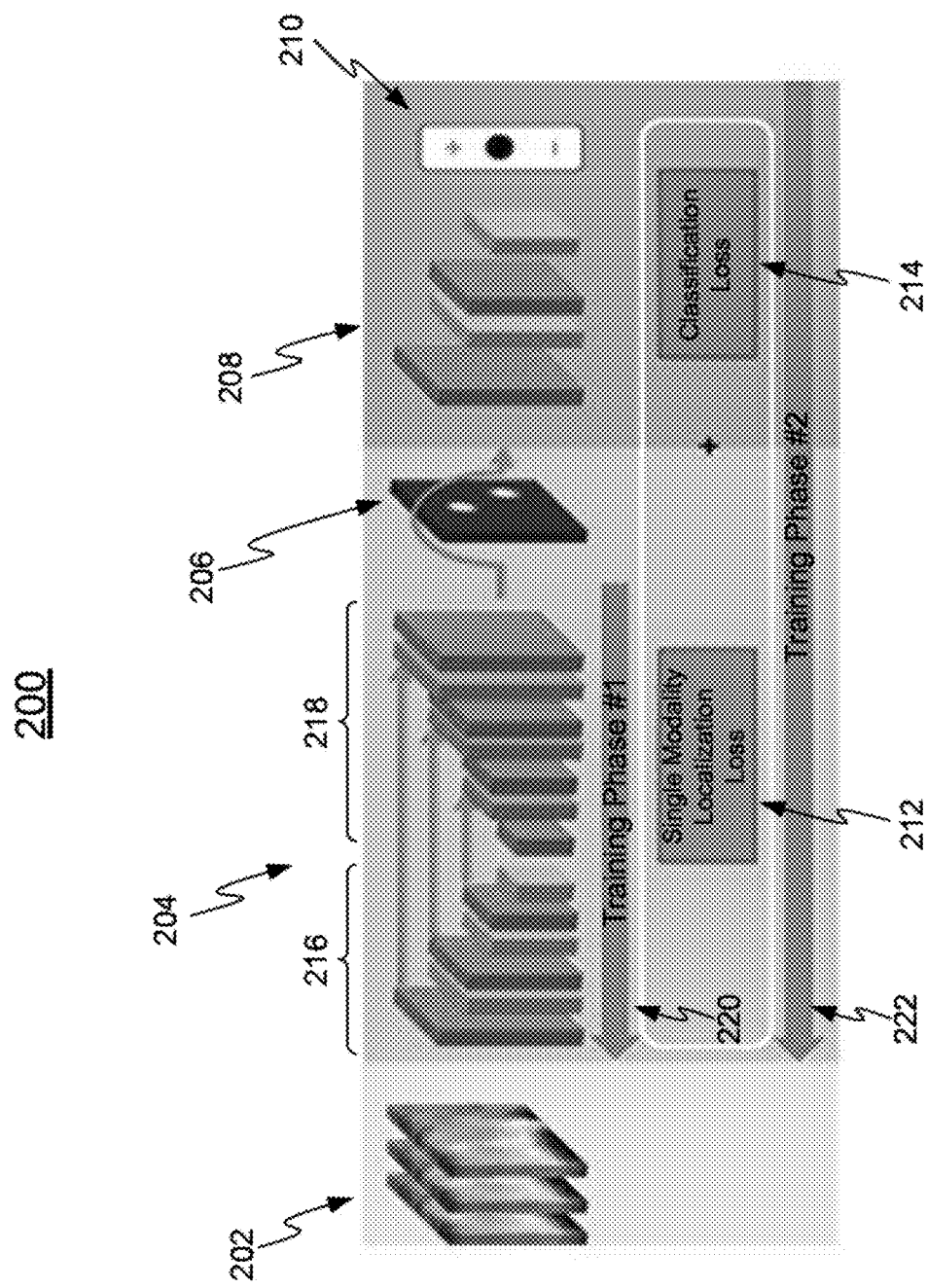
FIG. 2 shows a network architecture of a multi-task network, in accordance with one or more embodiments.

FIG. 2 shows a network architecture of a multi-task network 200, in accordance with one or more embodiments. Multi-task network 200 comprises localization network 204 and classification network 208. In one embodiment, multi-task network 200 may be applied to perform one or more steps of method 100 of FIG. 1. For example, localization network 204 may be the trained localization network employed at step 104 of FIG. 1 and classification network 208 may be the trained classification network employed at step 106 of FIG. 1.

Localization network 204 receives one or more input medical images 202 depicting a lesion. Input medical images 202 are shown in FIG. 2 as MR input medical images, but may be of any suitable modality. In one embodiment, input medical images 202 may be a stack of slices comprising slices above and below a main slice to insure out-of-place continuity of lesion boundaries.

Localization network 204 is implemented as an encoder-decoder network. The encoder-decoder network may have any suitable network structure for sematic lesion localization. As shown in FIG. 2, the encoder 216 of the localization network 204 has a series of layers that code input medical image 202 into a code whose size is substantially less than the size of the input medical image 202. The decoder 218 of localization network 204 has a series of layers that will then decode the code into the output localization map 206. All of the intermediate information generated in the encoder 216 is shared with the decoder 218 so that no information is lost in the encoding process. Localization map 206 is represented in FIG. 2 as a heat map representing a pixelwise location of the lesion with a Gaussian blur around the center of the lesion.

Classification network 208 receives input medical image 202 and localization map 206. Classification network 208 is implemented as a neural network having an input layer, one or more hidden layers, and an output layer. In one embodiment, classification network 208 is a pre-trained classification network (e.g., VGG-16 or ReNet) to increase performance. Classification network 208 outputs classification 210 of the lesion. Classification 210 may be of any suitable form. In one example, classification 210 is a binary classification of the lesion, such as, e.g., malignant or not malignant (i.e., benign) or benign or not benign (i.e., malignant).

Multi-task network 200 is trained during an offline or training stage according to a multi-phase training procedure. During a first training phase 220, shown in FIG. 2 as training phase #1, localization network 204 is individually and separately trained according to a single modality localization loss 212. Having learned a meaningful feature tensor for localization network 204, classification network 208 is trained during the second training phase 222, shown in FIG. 2 as training phase #2, using the weights of localization network 204 according to a classification loss 214. Additional weights of localization network 204 are also learned during the second training phase 222. The second training phase 222 relaxes the weights of the entire multi-task network 200 to fine-tune the model and allow localization network 204 and classification network 208 to benefit from each other.

For both single modality localization loss 212 and classification loss 214, a binary cross entropy loss function is chosen as the objective function. Other loss functions may be employed, such as, e.g., a multi-scale loss function. Combining the loss functions linearly with a weighting factor results in the overall loss that is optimized during the joint training procedure. Localization network 204 is trained with ground truth data comprising training medical images and corresponding lesion contours or approximate localization maps annotated at the center of lesions with a Gaussian blur applied around the center of the lesion. Classification network 208 is trained with ground truth data comprising training medical images, annotated with a binary label indicating the malignancy of a lesion, and corresponding localization maps.

In some embodiments, localization network 204 and classification network 208 may additionally or alternatively be trained based on lesion boundaries annotated on the training medical images in order to properly learn the lesion intensity characteristics. Furthermore, in order to increase sensitivity and reduce the false positive rate of multi-task network 200, false negative training medical images are introduced as negative cases.

In one embodiment, the anatomical knowledge of the prostate in terms of the entire gland or various zones within the gland are utilized. For example, the anatomical knowledge may be included as an additional channel of the input, used with the loss function computations, and/or used to mask various contrasts. Anatomical masks could either be used as hard organ and zone boundaries or as soft or diffused boundaries in either original or dilated forms.

In one embodiment, after computing localization map 206, a post-processing machine learning system is applied to operate on one or more of the following features: a size of a candidate lesion, an average intensity of various contrasts within the candidate lesion, a variance or other higher order statistical calculation of intensities within the candidate lesion, various radiomic features within the candidate lesion, and various lexicon based features computed within the candidate lesion by following standards or common domain knowledge established within the community. For example, regarding prostate lesions, lexicon based features could be computed following the Prostate Imaging Reporting and Data System (PI-RADS). Based on the localization map 206 and one or more of the above features, the post-processing machine learning system is trained to compute 1) a clinical relevance map for lesions to increase the detection rate of the overall system, and 2) a label to further ratify whether the candidate lesion is positive (i.e., clinically significant) or not to reduce the false positive rate of the system. The clinical relevance map is similar to a probability map that is specific to one or more chosen lexicon based features (i.e., the input lexicon based feature) or a nonlinear combination of lexicon based features (learned through a machine learning algorithm). Computation of the lexicon based features, such as, e.g., the PI-RADS lexicon for prostate lesions, may be performed based on candidate lesion shape and underlying intensities in various contrasts. The lesion shape is determined based on attributes computed for round, oval, lenticular, lobulated, water drop shaped, wedge shaped, linear, and irregular shapes. The lesion margin is computed based on attributes of the lesion border, such as, e.g., various contrasts, circumscribed, non-circumscribed, irregular, speculated, hyper/hypo intense, organized chaos (non-homogenous), and erased charcoal sign. In one embodiment, the lexicon based features (e.g., hypo/hyper intense) could be implemented using image processing filters and combined together using an additional network, through a logistic regression, or using similar models. In one embodiment, a similar post-processing learning system may be trained and applied to score the lesion.

Figure 3:
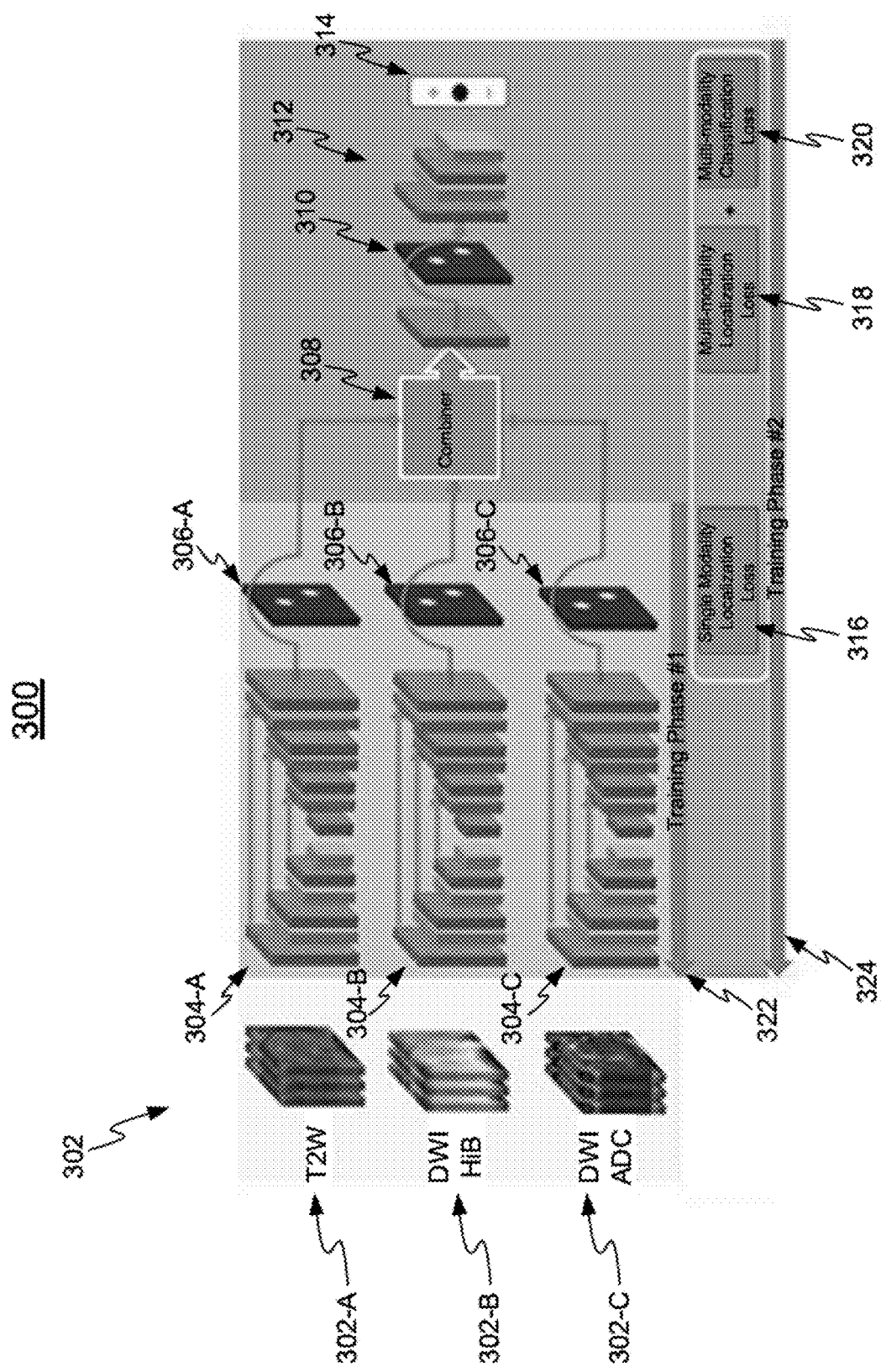
FIG. 3 shows a network architecture of a multi-modality fusion network, in accordance with one or more embodiments.

In accordance with one embodiment, the network architecture of multi-task network 200 may be modified as shown in FIG. 3 to leverage complementary information from a plurality of images of different modalities or domains, such as, e.g., images of an mpMRI image. An mpMRI image comprises a plurality of multi-modality images (e.g., acquired with different acquisition protocols). Exemplary images of an mpMRI image include T2 images, diffusion data images, multiple gradient images, contrast enhanced sequence, etc.

FIG. 3 shows a network architecture of a multi-modality fusion network 300, in accordance with one or more embodiments. The network architecture of multi-modality fusion network 300 is similar to the network architecture of multi-task network 200 of FIG. 2, but modified to leverage information of multi-modality images of an mpMRI image 302.

Multi-modality fusion network 300 receives an mpMRI image 302 of a lesion. mpMRI image 302 comprises a plurality of images acquired with different acquisition protocols (i.e., different modalities). Each image of the plurality of images of mpMRI image 302 may or may not depict the lesion. As shown in FIG. 3, the plurality of images of mpMRI image 302 includes T2 weighted (T2W) image 302-A, diffusion weighted imaging (DWI) High B-value (HiB) image 302-B, and DWI apparent diffusion coefficient (ADC) image 302-C. In some embodiments, additionally or alternatively to mpMRI image 302, multi-modality fusion network 300 may receive dynamic contrast enhanced (DCE) sequences which depict wash-in and wash-out of certain contrast agents through various tissue compartments. Early or late enhancement as expressed in the image sequences is an important feature for abnormality detection.

Each of the plurality of images of mpMRI image 302 is received by a respective localization network 304-A, 304-B, and 304-C (collectively referred to herein as localization network 304). It should be understood that localization network 302 may include any number of localization networks and is not limited to localization networks 304-A, 304-B, and 304-C. Similar to the network architecture of localization network 204 of FIG. 2, each localization network 304 is implemented as an encoder-decoder network. Each localization network 304 generates a respective localization map 306-A, 306-B, and 306-B (collectively referred to herein as localization maps 306).

Localization maps 306 are combined by combiner 308 to generate a combined localization map 310. Combiner 308 may perform any suitable operation to combine localization maps 306, such as, e.g., a concatenation or summation. In some embodiments, combiner 308 performs high-level non-linear merging, such as, e.g., a bilinear operation or heteromodal image segmentation (HeMIS).

Classification network 312 receives combined localization map 310 and the plurality of images of mpMRI image 302 and generates classification 314. Classification network 312 is implemented as a neural network, similar to the network architecture of classification network 208 of FIG. 2. Classification 314 is a binary classification (e.g., malignant or not malignant, benign or not benign), but may be of any suitable form.

While combiner 308 is shown in FIG. 3 located at the output of localization network 304, it should be understood that combiner 308 may be located at any suitable location and the network architecture of multi-modality fusion network 300 shown in FIG. 3 may be reconfigured accordingly. For example, in one embodiment, combiner 308 may be located at the input of localization network 304. In this embodiment, combiner 308 combines the plurality of images of mpMRI image 302 and the combined image is input into a single localization network 304, similar to the network architecture of multi-task network 200 of FIG. 2. In another embodiment, combiner 308 may be located at the output of classification network 312. In this embodiment, each of the plurality of images of mpMRI image 302 is received by a respective multi-task network 200 of FIG. 2 and combiner 308 combines the resulting classification for each image.

Similar to multi-task network 200, multi-modality fusion network 300 is trained during an offline or training stage according to a multi-phase training procedure. During a first training phase 322, shown in FIG. 3 as training phase #1, each localization network 304 is individually and separately trained according to single modality localization loss 316. Each localization network 304 may have the same network structure and may use the same single modality localization loss 316 for training. Having learned a meaningful feature tensor for localization network 304, classification network 312 is trained during the second training phase 324, shown in FIG. 3 as training phase #2, using the weights of localization network 304 according to a multi-modality localization loss 318 and a multi-modality classification loss 320. Additional weights of localization networks 304 are also learned during the second training phase 324. The second training phase 324 relaxes the weights of the entire multi-task network 300 to fine-tune the model and allow localization network 304 and classification network 312 to benefit from each other. In one embodiment, to further facilitate the training procedure of multi-modality fusion network 300, one or more localization networks 304 may be pre-trained and loaded into the multi-modality fusion network 300.

For single modality localization loss 316, multi-modality localization loss 318, and multi-modality classification loss 320, a binary cross entropy loss function is chosen as the objective function. Combining these functions linearly with a weighting factor results in the overall loss that is optimized during the joint training procedure. Localization network 304 is trained with ground truth data comprising training medical images and corresponding localization maps annotated at the center of lesions with a Gaussian blur applied at the center of the lesions. Classification network 312 is trained with ground truth data comprising training medical image, annotated with a binary label indicating the malignancy of a lesion, and corresponding localization maps.

In one embodiment, the plurality of images of mpMRI image 302 may be preprocessed to address or remove variability or variances between the plurality of images before being received by localization network 304. Removing variances between the plurality of images of mpMRI image 302 ensures a high level of performance even with limited data availability. Such variances may include geometric variances, intensity variances, variances in the ground truth preparation, or any other variance.

Geometric variability may be addressed to properly align the plurality of images of mpMRI image 302 for accurate and efficient reading. In particular, a registration step is performed to align the plurality of images of mpMRI image 302. In addition, to obtain uniform dimensionality and voxel spacing of the images across modalities and patient cases, each image is transformed to a space with identical dimensions and spacings (e.g., 15×15×9 cm and 0.5×0.5×3 mm/pixel, respectively). A prostate segmentation algorithm may be leveraged to center the images around the prostate (or any other object of interest). Thus, by removing geometric variability, each of the plurality of images of mpMRI image 302 will have the same size, orientation, spacing, and position properties.

To ensure a consistent intensity distribution across patient cases for the plurality of images of mpMRI image 302, various forms of normalization computations may be performed. First, the DWI images (i.e., images 302-B and 302-C) are interpolated to a common b-value (e.g., 2000) to ensure comparable intensities. The b-value is a factor that reflects the strength and the timing of the gradients used to generate diffusion-weighted images. In one embodiment, such DWI images are normalized according to an anatomical intensity range computed based on low b-value images. In one embodiment, a low b-value is a b-value less than 100 s/mm2, and preferably a b-value of 0. Additionally, a KTrans parametric map is computed from dynamic contrast enhanced (DCE) images with fixed model parameter values. The KTrans is computed based on a T1-weighted DCE sequence to represent the tissue permeability. Tissue permeability, along with early or late enhancement of contract, is informative in detecting and characterizing an abnormality. The T2W images (e.g., image 302-A) may be standardized based on the intensities of referencing tissues such as fat or muscle. The identification of referencing tissues may be performed using landmark detection models. To further ensure intensity comparability across patient cases of different modalities, the images are normalized. The normalization may be based on a median, average, or any other statistically robust metric, such as, e.g., an average of the middle two quartiles of an intensity histogram.

The ground truth annotations for training the localization network 304 could be directly obtained from radiologists in the form of 2D/3D lesion contours or in the form of lesion centers. If the ground truth annotations are in the form of lesion centers, the annotation is enhanced by placing a Gaussian blur around a point of the center of the lesion to remove the variability of the annotation of the lesion center. A reasonable peak and blurring factor are selected for the Gaussian blur to enable handling the detection problem as a segmentation task. The uncertainty in the location of annotation is built-in to the Gaussian standard deviation. In some embodiments, instead of using the annotated lesion centers with a Gaussian blur, 3D annotations of the lesions may be used for training localization network 304.

Figure 4:
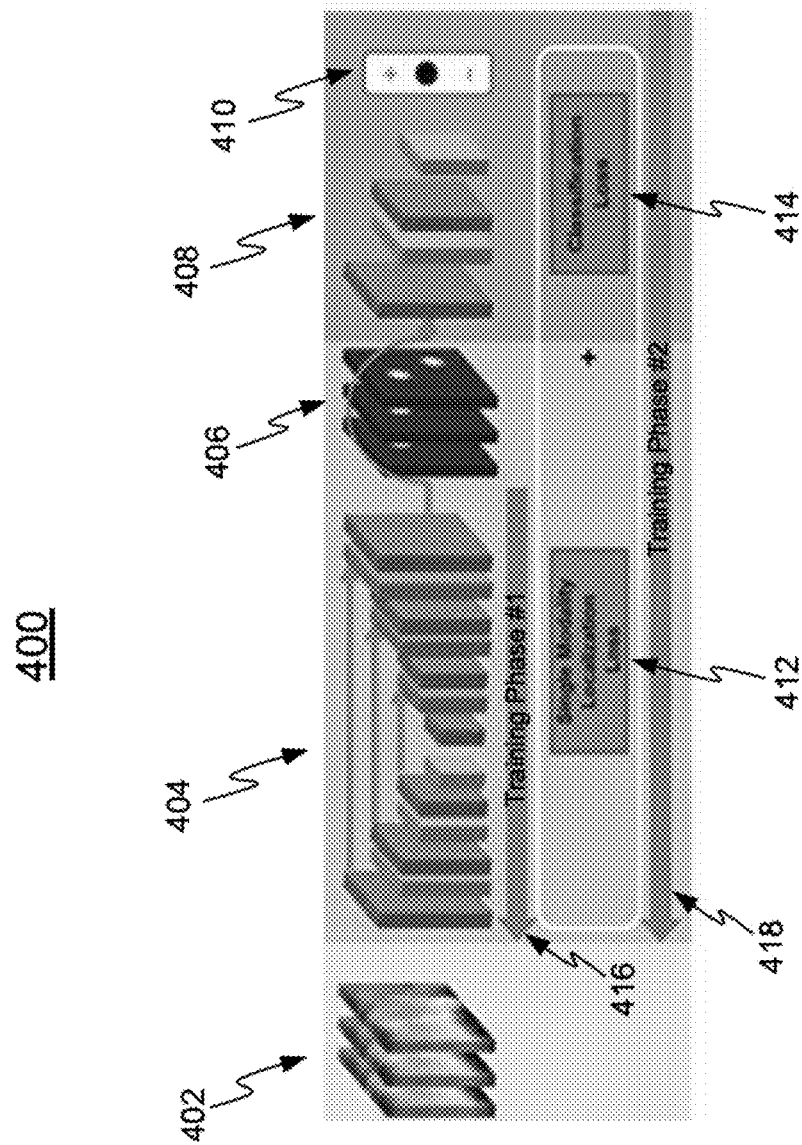
FIG. 4 shows a network architecture of a regression network, in accordance with one or more embodiments.

In accordance with one embodiment, the network architecture of multi-task network 200 may be modified as shown in FIG. 4 to not only detect potential lesions in a medical image, but also to determine a score of the lesion. FIG. 4 shows a network architecture of a regression network 400, in accordance with one or more embodiments. Regression network 400 comprises localization network 404 and classification network 408. Localization network 404 receives medical image 402 depicting one or more lesions and generates localization map 406 to not only localize the lesions but also to score the lesions. Accordingly, in one embodiment, localization map 406 may comprise one or more individual localization maps each associated with a score such that each individual localization map represents lesions for its associated score. In another embodiment, localization map 406 may be a multi-label heat map image where each pixel is labeled with a score. The score may be any suitable score. In one embodiment, where the lesion is on the prostate, the score is a PI-RADS score having a value between 1 and 5. Classification network 408 receives medical image 402 and localization map 406 and determines a classification 410.

Similar to multi-task network 200, regression network 400 is trained during an offline or training stage according to a multi-phase training procedure. During a first training phase 416, shown in FIG. 4 as training phase #1, localization network 404 is individually and separately trained according to a single modality localization loss 412. During a second training phase 418, shown in FIG. 4 as training phase #2, classification network 408 is trained to determine a classification loss 414 based on the weights of localization network 404. Additional weights for localization network 404 are also learned during the second training phase 418. Classification loss 414 is determined according to a binary cross entropy loss function as in multi-task network 200, while single modality localization loss 412 is determined as a mean squared error to accommodate the regression task.

In one embodiment, prostate lesions scored with PI-RADS 3 may be treated differently than other lesions (e.g., lesions scored with PI-RADS 4 or 5). This is due to the ambiguity in identifying PI-RADS 3 lesions and the difference in image features of PI-RADS 3 lesions and PI-RADS 4 or 5 lesions. In one embodiment, separate localization maps 406 may be generated for PI-RADS 3 lesions and PI-RADS 4 or 5 lesions. In another embodiment, additional output channels may be added to localization network 404 so that lesions located in different zones (e.g., peripheral zone or transitional zone) are detected based on different features. In another embodiment, to address ambiguity in PI-RADS 3 lesions, a soft mask (i.e., a probability mask) is used associating pixels with a probability of PI-RADS 3 lesions.

In one embodiment, in addition to or alternatively to the global lesion scoring approach of regression network 400, a patch-based approach may be applied to determine a score (e.g., a PI-RADS score for prostate lesions) using a deep neural network (or any other suitable machine learning network, such as, e.g., sequential or adversarial networks). During a training or offline stage, patches are cropped around clinically significant lesions (e.g., prostate lesions having a PI-RADS score greater than or equal to 3) from mpMRI images as training patches. The training patches are used to train the deep neural network for multi-class classification. The training objective is based on multi-class cross entropy. To impose more penalty on classification mistakes (e.g., classifying a PI-RADS 3 lesion as PI-RADS 5), a quadratic kappa coefficient can be utilized to evaluate the training. During the testing or online stage, a candidate patch comprising a lesion is extracted from an mpMRI image based on the localization map. The trained deep neural network receives the candidate patch and outputs a scorefor the lesion.

In one embodiment, instead of training the deep neural network on fixed size training patches, multi-size training patches can also be utilized to train the deep neural network to consider multi-scale contextual information of the lesion. In this way, the trained deep neural network will be more sensitive and accurate to different sizes of lesions. In addition, since (e.g., PI-RADS) scores are assigned according to the lesion location information, a separate patch network may be trained independent for different lesion areas. The model would explicitly utilize the lesion location information, similarly as the decision-making process of radiologists. Additionally, the kappa coefficient is currently utilized as an evaluation measure to select the best training model, but can be used to directly train the objective function.

In one embodiment, the network architecture of regression network 400 may be modified to leverage information of multi-modality images of an mpMRI image, similar to multi-task network 200 of FIG. 2.

In one embodiment, tissue based referencing may be incorporated to normalize different modalities of input images, if the modalities are not quantitative and vary significantly among different clinical sites (e.g., T2 weighted images or DWI High-B images). In particular, a segmentation map may be created on a reference tissue (e.g., a muscle) and the intensity values of that segmented tissue may be mapped to a common value so that an image intensity histogram of reference tissue remains identical across input images to normalize the input images, thereby removing the variability of the input images.

In one embodiment, prostate zonal segmentation results may be used to create a histogram of intensities (from localization maps) for each zone based on images from a cohort of patients acquired using an identical reference imaging protocol. The histogram mapping may be used to map a new patient histogram (from images acquired using a same or different imaging protocol) to the histogram of the cohort of patients to normalize the image intensities taken using different protocols and perhaps across various institutions. The objective is bring robustness to the entire process by removing unwanted variabilities.

In one embodiment, the prostate (or other object of interest) may be segmented to identify a number of zones, such as, e.g., central, peripheral, and transitional zones of the prostate. Segmentation masks of such zones may be input, e.g., into localization networks 204 of FIG. 2, 304 of FIGS. 3, and 404 of FIG. 4 and classification networks 208 of FIG. 2, 312 of FIGS. 3, and 408 of FIG. 4 to direct attention to these zones.

In accordance with another advantageous embodiment, systems and methods are provided for detecting an abnormality in a medical image according to the steps of method 500 of FIG. 5. Embodiments of the present invention learn a model of normal tissue and detect an abnormality in a medical image as a portion that deviates from the learned model.

FIG. 5 shows a method 500 for detecting an abnormality in a medical image, in accordance with one or more embodiments. Method 500 may be performed by any suitable computing device, such as, e.g., computer 1302 of FIG. 13. Method 500 will be described with reference to FIG. 6, which shows a workflow 600 for detecting an abnormality in a medical image, in accordance with one or more embodiments.

At step 502, an input medical image depicting an abnormality is received. An exemplary input medical image 602 is shown in workflow 600. The abnormality may be a fraction, bleeding, a lesion, or any other abnormality from normal (i.e., healthy) tissue. The input medical image may be of any suitable modality, such as, e.g., MRI, mpMRI, DynaCT, x-ray, US, etc. and may be 2D or 3D. The input medical image may be received directly from an image acquisition device used to acquire the input medical image. Alternatively, the input medical image may be received by loading a previously acquired medical image from a storage or memory of a computer system or receiving a medical image that has been transmitted from a remote computer system.

At step 504, different portions of the input medical image are deleted to generate a plurality of incomplete images. Workflow 600 shows a plurality of incomplete images 604-A, 604-B, 604-C, 604-D, and 604-E (collectively referred to herein as plurality of incomplete images 604) generated from input medical image 602. It should be understood that plurality of incomplete images 604 may include any number of images, and is not limited to the five images shown in workflow 600. Deleting the different portions of the input medical image 602 may include, e.g., removing portions from input medical image 602, masking portions of the input medical image 602, or applying any other suitable technique to delete portions from input medical image 602.

Figure 7A:
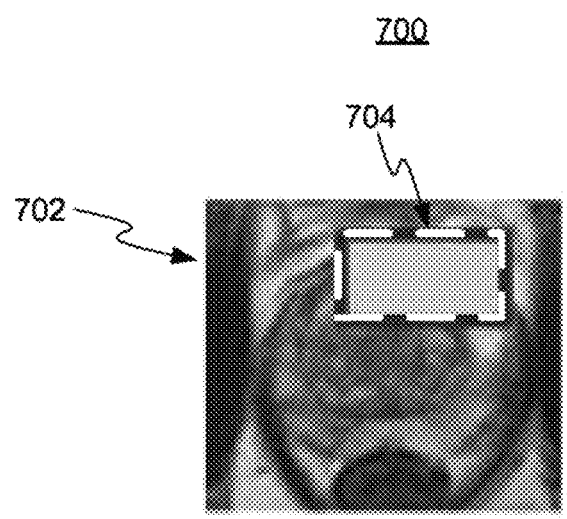
FIG. 7A shows an exemplary incomplete image, in accordance with one or more embodiments.

An exemplary incomplete image 700 is shown in FIG. 7A, in accordance with one embodiment. Incomplete image 700 comprises a deleted portion 704 of the input medical image and a remaining portion 702 of the input medical image. As used herein, remaining portion 702 is defined as all portions of the input medical image outside of the deleted portion 704 of the input medical image.

In one embodiment, different portions of input medical image 602 are deleted using one or more stencils, denoted as S. Stencil S may be represented as a spatial notch filter having pixelwise values between 0 through 1 (inclusive). Stencil S may sharp edges (e.g., a rectangular box) or may be a Gaussian function (having values between 0 and 1) centered on a pixel with various sigma (spread). Stencil S modifies pixel intensity values of input medical image 602 according to (e.g., proportional to) its filter values. In one embodiment, the filter values of stencil S are multiplied with the pixel intensity values of input medical image 602 that it is applied to, such that a filter value of 1 will leave the pixel intensity values unchanged, while a filter value of 0 will set the pixel intensity values to 0 (i.e., delete the pixels), while a filter value of 0.5 will set the pixel intensity values to half of their initial values. Stencil S may have any suitable size, shape, or any other characteristic.

The plurality of incomplete images 604 may be generated by deleting different portions from input medical image 602 by using different stencils S, by varying characteristics (e.g., size, shape, etc.) of a stencil S, and/or by varying the application pattern of one or more stencils S on input medical image 602. For example, the application pattern of stencil S may be a random application pattern, a predetermined application pattern, a targeted application pattern, or any other suitable pattern. The random application pattern may apply stencil S (e.g., a center of stencil S) randomly over input medical image 602 to randomly delete the different portions, e.g., to provide comprehensive coverage over input medical image 602. The predetermined application pattern may apply stencil S in a predetermined pattern such as, e.g., a raster pattern by applying stencil S to input medical image 602 from left to right, starting at a top left corner and ending at a bottom right corner. In one embodiment, a multi-resolution raster pattern may be applied by applying the raster pattern across various resolution levels. The targeted application pattern may apply stencil S to a target location, such as, e.g., a portion of input medical image 602 comprising a suspected abnormality. The portion of input medical image 602 comprising the suspected abnormality may be determined (or roughly determined) based on thresholding or any other classification or detection approach (e.g., having a high false positive rate).

In one embodiment, the plurality of incomplete images 604 may be generated using a trained machine learning network. The machine learning network may be trained with a supervised, semi-supervised, weakly supervised approach to select candidate regions of interest for deletion, thereby reducing the number and extent of deletions.

At step 506, a plurality of synthesized images is generated using a trained generative adversarial network (GAN). The GAN may be a deep convolutional GAN (DCGAN) but any suitable machine learning network may be additionally or alternatively employed. While step 506 is performed using a GAN, any known in-painting approach may be performed. Workflow 600 shows synthesized images 606-A, 606-B, 606-C, 606-D, and 606-E (collectively referred to herein as plurality of synthesized images 606). Each synthesized image 606-A, 606-B, 606-C, 606-D, and 606-E is generated from a respective one of incomplete images 606-A, 606-B, 606-C, 606-D, and 606-E.

Figure 7B:
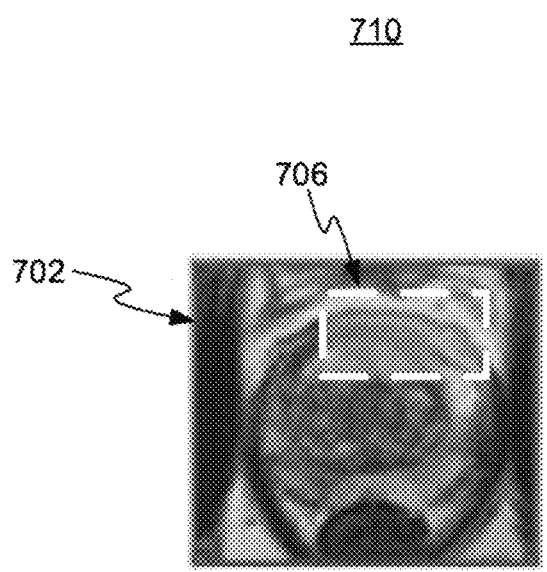
FIG. 7B shows an exemplary synthesized image, in accordance with one or more embodiments.

An exemplary synthesized image 710 is shown in FIG. 7B in accordance with one embodiment. Synthesized image 710 comprises remaining portion 702 of the input medical image and a synthesized portion 706 replacing deleted portion 704 (shown in FIG. 3A) of the input medical image. In one embodiment, synthesized portion 706 is synthesized normal (i.e., healthy) tissue.

The GAN comprises two modules in the form of deep networks: a generator G for generation of a synthesized image and a discriminator D for distinguishing between a real image and the synthesized image. During a training or offline stage, generator G(z) is trained to generate a synthesized training image from an incomplete training image z by replacing a deleted portion in incomplete training image with a synthesized portion representing normal (i.e., healthy) tissue using a large, unlabeled set of training images. Discriminator D classifies one image as real and the other image as fake (synthesized). Generator G(z) and discriminator D are simultaneously trained through a min max game such that while discriminator D is improving in terms of fake image detection, generator G(z) is improving in terms of producing realistic looking images capable of fooling discriminator D. Accordingly, generator G(z) and discriminator D are trained with adversarial loss to force generator G(z) to learn the most meaningful features.

During an online or testing stage, generator G(z) receives the plurality of incomplete images 604 as z to generate the plurality of synthesized images 606. The plurality of synthesized images 606 comprises remaining portions of its respective incomplete image 604 and synthesized (normal or healthy) portions replacing the deleted portions in its respective incomplete image 604. In some embodiments, an entirely new synthesized image 606 may be generated by generating the synthesized portion and regenerating the remaining portion, while in other embodiments synthesized image 606 is generated by only generating the synthesized portion while copying the imaging data of the remaining from its respective incomplete image 604. Discriminator D is only used during the training stage, and is not used during the online or inference stage, e.g., to generate the plurality of synthesized images 606.

A decoding network is also trained to create a distribution of feasible incomplete images z. The decoding network is trained with the loss function of Equation (1):

$$L = dist(I*S, G(z)*S) + \lambda L_{discriminator}(G(z)) \quad (1)$$

where dist is a distance metric, S is the stencil, I is the input medical image (e.g., input medical image 602), G(z) is the synthesized image (e.g., synthesized image 606) generated from incomplete image z (incomplete image 604), $L_{discriminator}$ is the loss function of the discriminator, and $\lambda$ is a weighting term. Any suitable distance metric dist may be used to compare images stenciled by stencil S. The decoding network loss function is balanced with the discriminator loss $L_{discriminator}$ to keep the synthesized image close to the training set. The training of the decoding network is performed using a large, unlabeled set of training images and variations of stencil S. During the online or testing stage, given a stenciled image (e.g., incomplete image 604), the most likely incomplete image z is computed.

At step 508, a normal image is determined from the plurality of synthesized images. As shown in workflow 600, normal image 608 is determined from plurality of synthesized images 606. A particular synthesized image 606 that depicts the healthiest tissue (i.e., without abnormalities) is selected as normal image 608 by determining the cluster center of the outlier from synthesized images 606. Since input medical image 602 depicts an abnormality, in one embodiment, normal image 608 is selected as the synthesized image 606 that maximizes a distance metric between each of the plurality of synthesized images 606 and input medical image 602. Any suitable distance metric may be used. Other approaches may be based on learning the distance metric based on annotated data. In one embodiment, a network may be trained to optimally detect latent variable outliers based on labeled data.

At step 510, the abnormality is detected in the input medical image based on the input medical image and the normal image. Workflow 600 shows abnormality detector 610 detecting an abnormality in input medical image 602 based on input medical image 602 and complete image 608. In one embodiment, a machine learning detection network is trained to generate a localization map 612 identifying a location of the abnormality, given input medical image 602 and complete image 608. In one embodiment, a fully convolutional network (FCN) is trained for projecting normal image 608 and input medical image 602 to generate localization map 612, using a decoder. In this approach, the encoder does not enter the training process.

The localization map may be of any suitable form. In one embodiment, the localization map 612 is a pixelwise binary heat map having an intensity value of 1 to represent pixels where the lesion is located and an intensity value of 0 to represent pixels where the lesion is not located. In another embodiment, the localization map 612 is a pixelwise probability heat map having an intensity value ranging from 0 to 1 (inclusive) representing a probability that a pixel represents a lesion. A Gaussian blur may be placed around a center of the lesion in the heat map. In one embodiment, the training of the detector network is performed using a supervised (or weakly supervised) mechanism, where the location of the abnormality is provided as a ground truth mask. The loss function for the detection network may be based on a DICE score (i.e., Dice similarity coefficient) and binary cross entropy between the predicted localization map and the ground truth heat map.

At step 512, a localization map of the detected abnormality is output. In workflow 600, localization map 612 is output by abnormality detector 610. The localization map of the detected abnormality can be output by displaying the localization map on a display device of a computer system (computer 1302 of FIG. 13), storing the localization map on a memory or storage of a computer system (computer 1302 of FIG. 13), or by transmitting the localization map to a remote computer system.

In one embodiment, the machine learning network applied in method 500 may be jointly trained with an end-to-end refinement to optimize the overall performance for detecting the location of abnormalities. In one embodiment, in addition to or alternatively to detecting a location of abnormalities according to method 500, various labels and subtypes may also be detected, such as, e.g., a level of aggressiveness.

In accordance with one embodiment, systems and methods are provided for training and applying a deep learning model using multi-site training datasets according to the steps of method 800 of FIG. 8.

Recently, deep learning has been extensively applied in medical image analysis tasks. However, the success of deep learning in conventional computer vision tasks has not yet transferred to many critical needs in medical imaging, partly due to the lack of large-scale annotated training datasets. To address this issue, it is often times necessary to combine data from multiple clinical sites in order to successfully train deep learning based models. The challenge for training deep learning models based on such multi-site datasets is generalizability—the ability to transfer a deep learning model trained on multi-site training datasets to a dataset at a specific clinical site where the trained deep learning model is to be applied.

Advantageously, embodiments of the present invention provide for training a deep learning model based on multi-site training datasets in two stages: a training stage and a deployment stage. During the training stage, the focus is on the exploration of useful information in the multi-site dataset to train a deep learning model that reveals the underlying global population distribution for a specific clinical task. During the deployment stage, the trained deep learning model is refined (i.e., adjusted or adapted) for a deployment dataset associated with a deployment clinical site where the refined deep learning model is to be deployed.

Formally, the problem of training a deep learning model to perform a task based on a multi-site dataset may be defined as follows. Given a core annotated dataset (source dataset) $D_S=\{(x_i^s, y_i^s)\}_{i=1}^{Ns}$, a relatively smaller annotated dataset $D_M$ comprising a plurality of smaller sub-datasets $D_M=\{D_{m1}, \ldots, D_{mj}\}_{j=1}^J$ from different clinical sites, and a deployment dataset $D_d=\{D_{dl}, D_{du}\}_{j=1}^J$ from a deployment clinical site comprising an annotated dataset $D_{dl}$ and an unlabeled dataset $D_{du}$, a deep learning model $\theta$ is trained from a multi-site dataset $D_S \cup D_M$ for performing a task T on deployment dataset $D_d$. $D_{dl}=\{(x_i^{dl}, y_i^{dl})\}_{i=1}^{Ndl}$ refers to an annotated sub-dataset of deployment dataset $D_d$ comprising a relatively very small amount of annotated samples associated with the deployment site. $D_{du}=\{(x_i^{du})\}_{i=1}^{Ndu}$ refers to an unlabeled sub-dataset of deployment dataset $D_d$ comprising a relatively large amount of unlabeled or future-received data associated with the deployment site. Typically, the amount of data in source dataset $D_S$ is much larger than the amount of data in dataset $D_M$, which is much larger than the amount of data in annotated dataset $D_{dl}$ associated with the deployment site, such that $N_S \gg N_{mj} \gg N_{dl}$.

FIG. 8 shows a method 800 for training a deep learning model based on a multi-site dataset, in accordance with one or more embodiments. Method 800 may be performed by any suitable computing device, such as, e.g., computer 1302 of FIG. 13. While method 800 is described for training a deep learning model, it should be understood that method 800 may be applied for training any machine learning network. In one embodiment, method 800 may be applied to train any of the machine learning networks described herein. The deep learning model is trained according to method 800 in two stages: a training stage and a deployment stage.

At step 802, a multi-site dataset associated with different clinical sites and a deployment dataset associated with a deployment clinical site are received. The multi-site dataset comprises dataset $D_S$ and the sub-datasets of dataset $D_M$ and the deployment dataset $D_d$ comprises annotated dataset $D_{dl}$ and unlabeled dataset $D_{du}$. The different clinical sites associated with the multi-site dataset may refer to, e.g., different medical practices, particular offices of a medical practice, medical networks or associations, hospitals, clinics, laboratories, pharmacies, insurance networks, and/or any other suitable clinical site.

At step 804, a deep learning model is trained based on the multi-site dataset $D_S \cup D_M$. Step 804 is performed during a training stage for training the deep learning model. The goal is to learn an unbiased, generalized deep learning model $\tilde{\theta}^{train}$ for the multi-site dataset $D_S \cup D_M$ for a specific global task T. In one embodiment, step 804 is performed according to method 900 of FIG. 9, described in detail below.

At step 806, the trained deep learning model $\tilde{\theta}^{train}$ is optimized (i.e., refined, adjusted, or adapted) based on the annotated dataset $D_{dl}$ of deployment dataset $D_d$. Step 806 is performed during a deployment stage for training the deep learning model. The goal is to refine the learned deep learning model $\tilde{\theta}^{train}$ for performing task T based on the annotated dataset $D_{dl}$ of deployment dataset $D_d$. The optimized trained deep learning model is denoted $\theta$. In one embodiment, step 806 is performed according to method 1100 of FIG. 11, described in detail below.

At step 808, the optimized trained deep learning model $\theta$ is output. For example, the optimized trained deep learning model $\theta$ can be output by storing the optimized trained deep learning model $\theta$ on a memory or storage of a computer system (computer 1302 of FIG. 13) or by transmitting the optimized trained deep learning model $\theta$ to a remote computer system (e.g., at the deployment site). Advantageously, the optimized trained deep learning model $\theta$ will be better generalized on the unlabeled deployment dataset $D_{du}$ associated with the deployment clinical site.

FIG. 9 shows a method 900 for training a deep learning model based on a multi-site dataset, in accordance with one or more embodiments. In one embodiment, the steps of method 900 may be performed at step 804 of FIG. 8. Method 900 may be performed by any suitable computing device, such as, e.g., computer 1302 of FIG. 13. Method 900 will be described with references to FIG. 10, showing an algorithm 1000 for training a deep learning model $\tilde{\theta}^{train}$ based on a multi-site dataset in accordance with one or more embodiments.

The goal of method 900 is to learn an unbiased, generalized deep learning $\tilde{\theta}^{train}$ for the multi-site dataset $D_S \cup D_M$ for a specific global task T. Accordingly the objective function is to minimize the global risk or error function of Equation (2):

$$\theta^* = \arg\min E = \sum_{(x,y) \in D_S \cup D_m} p(x, y) \cdot L(x, y, \theta) \quad (2)$$

where p(x,y) is the joint distribution over the observations and annotations and L(x,y,$\theta$) is the loss function for the deep learning model parameterized by $\theta$. Since, the deep learning model $\tilde{\theta}^{train}$ is not trained according to deployment dataset $D_d$ during this training stage, the best strategy for training deep learning model $\tilde{\theta}^{train}$ is to optimize it with respect to the multi-site dataset $D_S \cup D_M$, which is a subset of the overall population dataset $D_{all}$ for task T. This will potentially lead to the most generalizable deep learning model for any potential unseen deployment data. The cross-validation performance of the deep learning model trained using multi-site dataset $D_S \cup D_M$ during the training phase is denoted $P_1^{train}$. The cross validation performance of the deep learning model trained using only $D_S$ during the training phase is denoted $P_0^{train}$.

Considering that the amount of data in source dataset $D_S$ is much larger than the amount of data in a given sub-dataset $D_{mj}$ (i.e., $N_S \gg N_{mj}$) and considering that all samples are not equal, a curriculum learning strategy is provided by progressively and repeatedly fine-tuning or updating a pre-trained deep learning model $\theta_0$, pretrained on samples of dataset $D_S$, using datasets $D_{mj}$ of dataset $D_M$ that are most similar to dataset $D_S$.

At step 902, 1) a multi-site dataset comprising a first major dataset $D_S$ and a second dataset $D_M$ (comprising a plurality of sub-datasets $\{D_{m1}, \ldots, D_{mj}\}_{j=1}^J$) and 2) a pretrained deep learning model $\theta_0$ pretrained on the first dataset $D_S$ are received. Step 902 is represented as step 1002 in algorithm 1000. The multi-site dataset is associated with different clinical sites.

At step 904, the plurality of sub-datasets $\{D_{m1}, \ldots, D_{mj}\}j=1^J$ of the second dataset $D_M$ are reordered based on a similarity between the first dataset $D_S$ and each of the plurality of sub-datasets $\{D_{m1}, \ldots, D_{mj}\}_{j=1}^J$ of the second dataset $D_M$. Step 904 is represented as step 1004 in algorithm 1000. In one embodiment, the sub-datasets $\{D_{m1}, \ldots, D_{mj}\}_{j=1}^J$ of second dataset $D_M$ are reordered from the most similar sub-dataset, to the least similar sub-dataset, to the first dataset $D_S$. The reordered second dataset, comprising the reordered plurality of sub-datasets $\{D_{m1}, \ldots, D_{mj}\}_{j=1}^J$, is denoted $\tilde{D}_m$. The similarity between the first dataset $D_S$ and the each of the plurality of sub-datasets $\{D_{m1}, \ldots, D_{mj}\}_{j=1}^{J}$ of the second dataset $D_M$ is determined based upon a similarity measure $S(D_S, D_{mj})$. The similarity measure may be any suitable similarity measure, such as, e.g., the Kullback-Leibler divergence, total variation distance, the Wasserstein metric, the maximum mean discrepancy, or any other suitable similar measure.

At step 906, a trained deep learning model $\tilde{\theta}^{train}$ is determined based on the pretrained deep learning model $\theta_0$ and the reordered second dataset $\tilde{D}_m$. Step 906 is represented as steps 1006 in algorithm 1000. In particular, as shown at steps 1006 in algorithm 1000, the pretrained deep learning model $\theta_0$ is selectively and iteratively updated (or fine-tuned) with particular sub-datasets $D_{mj}$ of the reordered second dataset $\tilde{D}_m$ to provide an updated deep learning model $\tilde{\theta}_i$.

In one embodiment, as shown at steps 1006 of algorithm 1000, for each respective sub-dataset i in reordered second dataset $\tilde{D}_m$, starting from the first sub-dataset (i.e., the sub-dataset that is most similar to the first dataset $D_S$) to the last sub-dataset (i.e., the sub-dataset that is least similar to the first dataset $D_S$), the pretrained deep learning model $\theta_0$ is iteratively updated by performing a first comparison and a second comparison. The first comparison is between 1) a performance $P_i^{train}$ of the pretrained deep learning model (pretrained on the first dataset $D_S$) iteratively updated with the respective sub-dataset $D_{mj}$ and any prior sub-datasets $D_{mj}$ from prior iterations and 2) a performance $P_0^{train}$ of the pretrained deep learning model (pretrained on the first dataset $D_S$). The second comparison is between 1) the performance $P_i^{train}$ of the pretrained deep learning model (pretrained on the first dataset $D_S$) iteratively updated with the respective sub-dataset $D_{mj}$ and any prior sub-datasets $D_{mj}$ from prior iterations, and 2) a performance $P_1^{train}$ of the deep learning model trained on the pooled multi-site dataset $D_S \cup D_M$.

The pretrained deep learning model $\theta_0$ is iteratively updated (i.e., at each iteration) using the respective sub-dataset $D_{mj}$ based on the first comparison and the second comparison. In one example, as shown at steps 1006 of algorithm 1000, the pretrained deep learning model $\theta_0$ is iteratively updated with a respective sub-dataset $D_{mj}$ only where the cross-validation performance $P_i^{train}$ of the pretrained deep learning model $\theta_0$ iteratively updated with particular respective sub-datasets $D_{mj}$ (and any prior sub-datasets $D_{mj}$ from prior iterations) is greater than or equal to: 1) the cross-validation performance $P_0^{train}$ of the pretrained deep learning model $\theta_0$, and 2) the cross-validation performance $P_1^{train}$ of the deep learning model trained using the pooled multi-site dataset $D_S \cup D_M$. Accordingly, the pretrained deep learning model $\theta_0$ is iteratively updated with particular respective sub-datasets $D_{mj}$ only where the respective sub-dataset $D_{mj}$ would improve performance as compared to the pretrained deep learning model $\theta_0$ and the deep learning model trained on multi-site dataset $D_S \cup D_M$.

The first comparison, the second comparison, and the updating steps are iteratively repeated for each respective sub-dataset i in reordered second dataset $\tilde{D}_m$, starting from the first sub-dataset to the last sub-dataset. At each iteration, the pretrained deep learning model $\theta_0$ may be updated with the respective sub-dataset i based on the first and second comparisons. Accordingly, at each particular iteration, the cross-validation performance $P_i^{train}$ is calculated based on the pretrained deep learning model $\theta_0$ iteratively updated with the respective sub-datasets $D_{mj}$ for that iteration and any prior sub-datasets $D_{mj}$ during prior iteration (if any). The final updated deep learning model is denoted as the trained deep learning model $\tilde{\theta}^{train}$.

At step 908, the trained deep learning model $\tilde{\theta}^{train}$ is output. For example, the trained deep learning model $\tilde{\theta}^{train}$ can be output by storing the trained deep learning model $\tilde{\theta}^{train}$ on a memory or storage of a computer system (computer 1302 of FIG. 13) or by transmitting the trained deep learning model $\tilde{\theta}^{train}$ to a remote computer system.

FIG. 11 shows a method 1100 for optimizing a trained deep learning model $\tilde{\theta}^{train}$ for performing task T based on a deployment dataset $D_d$, in accordance with one or more embodiments. In one embodiment, the steps of method 1100 may be performed at step 806 of FIG. 8. Method 1100 may be performed by any suitable computing device, such as, e.g., computer 1302 of FIG. 13. Method 1100 will be described with references to FIG. 12, showing an algorithm 1200 for optimizing a trained deep learning model $\tilde{\theta}^{train}$ based on a multi-site dataset in accordance with one or more embodiments.

The goal is to refine a trained deep learning model $\tilde{\theta}^{train}$ based on a specific deployment dataset $D_d$ for performing a specific task T. Accordingly, the objective function is to minimize the local risk or error function of Equation (3):

$$\theta^* = \operatorname{argmin} E = \sum_{(x,y) \in D_d} p(x, y) \cdot L(x, y, \theta) \quad (3)$$

Since the annotated portion $D_{dl}$ of deployment dataset $D_d$ is relatively small, optimizing the trained deep learning model $\tilde{\theta}^{train}$ based purely on annotated deployment dataset $D_{dl}$ may lead to sub-optimal performance when applied to unlabeled (i.e., unseen) deployment dataset $D_{du}$. It is assumed that unlabeled deployment dataset $D_{du}$ is more similar to the population dataset $D_{all}$ than to annotated deployment dataset $D_{dl}$, due to the (relatively) extremely small size of annotated deployment dataset $D_{dl}$. Under this assumption, not every sample in annotated deployment dataset $D_{dl}$ will contribute positively for refining trained deep learning model $\tilde{\theta}^{train}$. Accordingly, the uncertainty of each sample in annotated deployment dataset $D_{dl}$ will be quantified and the trained deep learning model $\tilde{\theta}^{train}$ will be selectively and iteratively trained based on the uncertainty to optimize the trained deep learning model $\tilde{\theta}^{train}$.

At step 1102, 1) an annotated deployment dataset $D_{dl}$ of the deployment dataset $D_d$ and 2) a trained deep learning model $\tilde{\theta}^{train}$ trained on the multi-site data are received. Step 1102 is represented as step 1202 in algorithm 1200. The trained deep learning model $\tilde{\theta}^{train}$ may be the trained deep learning model $\tilde{\theta}^{train}$ trained according to method 900 of FIG. 9. The cross-validation performance of the trained deep learning model $\tilde{\theta}^{train}$ (pretrained using the dataset $D_S$ and iteratively updated with particular sub-datasets $D_{mj}$, e.g., as in method 900 of FIG. 9) during the training phase is denoted as $P_0^{deploy}$. The cross-validation performance of the deep learning model trained only using annotated deployment dataset $D_{dl}$ during the deployment phase is denoted as $P_0^{deploy}$.

At step 1104, the annotated deployment dataset $D_{dl}$ is reordered based on an uncertainty associated with each sample in the annotated deployment dataset $D_{dl}$. Step 1104 is represented as set 1204 in algorithm 1200. In one embodiment, the trained deep learning model $\tilde{\theta}^{train}$ is directly applied to each sample in annotated deployment dataset $D_{dl}$ to generate a pseudo-label and its corresponding posterior probability. By comparing the pseudo-label with the annotation, the uncertainty of each sample in annotated deployment dataset $D_{dl}$ can be determined and ranked. For example, probability values closer to 0.5 may indicate much more uncertainty than probability values closing to 0 or 1. The uncertainty of each sample may be determined based on an uncertainty measure $U(D_{dl}, \tilde{\theta}^{train})$, which may be any suitable uncertainty measure. In one embodiment, the annotated deployment dataset $D_{dl}$ is reordered from the most certain (i.e., least uncertain) to the least certain. The reordered annotated deployment dataset is denoted $\tilde{D}_{dl}$.

At step 1106, the trained deep learning model $\tilde{\theta}^{train}$ is optimized based on the reordered annotated deployment dataset $\tilde{D}_{dl}$ to provide an optimized trained deep learning model $\tilde{\theta}^{deploy}$. Step 1106 is represented as steps 1206 in algorithm 1200. In particular, as shown at steps 1206 in algorithm 1200, the trained deep learning model $\tilde{\theta}^{train}$ is selectively and iteratively updated (or refined) with particular samples of the ordered annotated deployment dataset $\tilde{D}_{dl}$.

In one embodiment, as shown at steps 1206 of algorithm 1200, for each sample i in the reordered annotated deployment dataset $\tilde{D}_{dl}$, starting from the first sample (i.e., the sample that is most certain) to the last sample (i.e., the sample that is least certain), the trained deep learning model $\tilde{\theta}^{train}$ is iteratively optimized by performing a first comparison and a second comparison. The first comparison is between 1) a performance $P_i^{deploy}$ of the trained deep learning model $\tilde{\theta}^{train}$ (pretrained using the dataset $D_S$ and iteratively updated with particular sub-datasets $D_{mj}$, e.g., according to method 900 of FIG. 9) iteratively updated with the respective sample and any prior samples from prior iterations, and 2) a performance $P_j^{train}$ of the trained deep learning model $\tilde{\theta}^{train}$. The second comparison is between 1) a performance $P_i^{deploy}$ of the trained deep learning model $\tilde{\theta}^{train}$ iteratively updated with the respective sample and any prior samples from prior iterations, and 2) a performance $P_0^{deploy}$ of a deep learning model trained only with annotated deployment dataset $D_{dl}$.

The trained deep learning model $\tilde{\theta}^{train}$ is iteratively updated (i.e., at each iteration) using the respective samples of reordered annotated deployment dataset $\tilde{D}_{dl}$ based on the first comparison and the second comparison. In one example, as shown at steps 1206 of algorithm 1200, the trained deep learning model $\tilde{\theta}^{train}$ is iteratively updated with the respective sample only where the cross-validation performance $P_i^{deploy}$ of the trained deep learning model $\tilde{\theta}^{train}$ iteratively updated with particular respective samples (and any prior samples from prior iterations) of annotated deployment dataset $D_{dl}$ is greater than or equal to: 1) the cross-validation performance $P_j^{train}$ of the trained deep learning model $\tilde{\theta}^{train}$ (minus some error $\in$), and 2) the cross-validation performance $P_0^{deploy}$ of a deep learning model trained only with annotated deployment dataset $D_{dl}$. Accordingly, the trained deep learning model $\tilde{\theta}^{train}$ is iteratively updated with particular respective samples of reordered annotated deployment dataset $\tilde{D}_{dl}$ only where the particular respective sample of $\tilde{D}_{dl}$ would improve performance as compared to the trained deep learning model $\tilde{\theta}^{train}$ and the deep learning model trained only with the annotated deployment dataset $D_{dl}$.

The first comparison, the second comparison, and the updating steps are iteratively repeated for each respective sample i in reordered annotated deployment dataset $\tilde{D}_{dl}$, starting from the first sample to the last sample. At each iteration, the trained deep learning model $\tilde{\theta}^{train}$ may be updated with the respective sample of reordered annotated deployment dataset $\tilde{D}_{dl}$ based on the first and second comparison. Accordingly, at each particular iteration, the cross-validation performance $P_i^{deploy}$ is calculated based on the trained deep learning model $\tilde{\theta}^{train}$ iteratively updated with the sample of annotated deployment dataset $D_{dl}$ for that particular iteration and any prior samples of annotated deployment dataset $D_{dl}$ for prior iterations (if any). The final refined deep learning model is denoted as the optimized trained deep learning model $\tilde{\theta}^{deploy}$.

The cross-validation performance for the (training) multi-site dataset $D_S \cup D_M$ is considered in order to not overfit the annotated deployment dataset $D_{dl}$. To relax the constraints from the multi-site dataset, the cross-validation performance on the annotated deployment dataset $D_{dl}$ should be monotonically increasing and the cross-validation performance on multi-site dataset $D_S \cup D_M$ should be within a certain range (defined by error $\in$).

At step 1108, the refined deep learning model $\tilde{\theta}^{deploy}$ is output. For example, the refined deep learning model $\tilde{\theta}^{deploy}$ can be output by storing the refined deep learning model $\tilde{\theta}^{deploy}$ on a memory or storage of a computer system (computer 1302 of FIG. 13) or by transmitting the refined deep learning model $\tilde{\theta}^{deploy}$ to a remote computer system.

Other embodiments of the invention are described as follows.

One embodiment of the invention is a method for detecting an abnormality in a medical image. The method comprises receiving an input medical image depicting an abnormality, deleting different portions of the input medical image to generate a plurality of incomplete images, each of the plurality of incomplete images comprising a deleted portion of the input medical image and a remaining portion of the input medical image, generating a plurality of synthesized images using a trained generative adversarial network, each of the plurality of synthesized images generated from a respective one of the plurality of incomplete images to comprise the remaining portion of the respective incomplete image and a synthesized portion replacing the deleted portion of the respective incomplete image, determining a normal image from the plurality of synthesized images, and detecting the abnormality in the input medical image based on the input medical image and the normal image.

In one embodiment of the invention, deleting different portions of the input medical image to generate a plurality of incomplete images comprises randomly deleting the different portions of the input medical image to generate the plurality of incomplete images.

In one embodiment of the invention, deleting different portions of the input medical image to generate a plurality of incomplete images comprises deleting the different portions of the input medical image based on a predetermined pattern to generate the plurality of incomplete images.

In one embodiment of the invention, deleting different portions of the input medical image to generate a plurality of incomplete images comprises deleting a portion of the input medical image comprising a suspected abnormality.

In one embodiment of the invention, deleting different portions of the input medical image to generate a plurality of incomplete images comprises applying stencils of different sizes or shapes to the input medical image.

In one embodiment of the invention, determining a normal image from the plurality of synthesized images comprises determining the normal image as a particular synthesized image, of the plurality of synthesized images, that depicts a healthiest tissue.

In one embodiment of the invention, determining the normal image as a particular synthesized image, of the plurality of synthesized images, that depicts a healthiest tissue comprises determining the particular synthesized image as one of the plurality of synthesized images that maximizes a distance metric between the plurality of synthesized images and the input medical image.

In one embodiment of the invention, the method further comprises training the trained generative adversarial network by receiving a multi-site dataset associated with different clinical sites and a deployment dataset associated with a deployment clinical site, training a deep convolutional generative adversarial network based on the multi-site dataset, and optimizing the trained deep convolutional generative adversarial network based on the deployment dataset to provide the trained generative adversarial network.

In one embodiment of the invention, the multi-site dataset comprises a first dataset and a second dataset, and training a deep convolutional generative adversarial network based on the multi-site dataset comprises reordering the second dataset based on a similarity of the first dataset and the second dataset, and determining the trained deep convolutional generative adversarial network based on a pretrained deep learning model and the reordered second dataset.

In one embodiment of the invention, optimizing the trained deep convolutional generative adversarial network based on the deployment dataset to provide the trained generative adversarial network comprises reordering an annotated deployment dataset of the deployment dataset based on an uncertainty, and determining the optimized deep convolutional generative adversarial network based on the trained deep convolutional generative adversarial network and the reordered annotated deployment dataset.

One embodiment of the invention is an apparatus for detecting an abnormality in a medical image. The apparatus comprises means for receiving an input medical image depicting an abnormality, means for deleting different portions of the input medical image to generate a plurality of incomplete images, each of the plurality of incomplete images comprising a deleted portion of the input medical image and a remaining portion of the input medical image, means for generating a plurality of synthesized images using a trained generative adversarial network, each of the plurality of synthesized images generated from a respective one of the plurality of incomplete images to comprise the remaining portion of the respective incomplete image and a synthesized portion replacing the deleted portion of the respective incomplete image, means for determining a normal image from the plurality of synthesized images, and means for detecting the abnormality in the input medical image based on the input medical image and the normal image.

In one embodiment of the invention, the means for deleting different portions of the input medical image to generate a plurality of incomplete images comprises means for randomly deleting the different portions of the input medical image to generate the plurality of incomplete images.

In one embodiment of the invention, the means for deleting different portions of the input medical image to generate a plurality of incomplete images comprises means for deleting the different portions of the input medical image based on a predetermined pattern to generate the plurality of incomplete images.

In one embodiment of the invention, the means for deleting different portions of the input medical image to generate a plurality of incomplete images comprises means for deleting a portion of the input medical image comprising a suspected abnormality.

In one embodiment of the invention, the means for deleting different portions of the input medical image to generate a plurality of incomplete images comprises means for applying stencils of different sizes or shapes to the input medical image.

One embodiment of the invention is a non-transitory computer readable medium storing computer program instructions for detecting an abnormality in a medical image. The computer program instructions when executed by a processor cause the processor to perform operations comprising receiving an input medical image depicting an abnormality, deleting different portions of the input medical image to generate a plurality of incomplete images, each of the plurality of incomplete images comprising a deleted portion of the input medical image and a remaining portion of the input medical image, generating a plurality of synthesized images using a trained generative adversarial network, each of the plurality of synthesized images generated from a respective one of the plurality of incomplete images to comprise the remaining portion of the respective incomplete image and a synthesized portion replacing the deleted portion of the respective incomplete image, determining a normal image from the plurality of synthesized images, and detecting the abnormality in the input medical image based on the input medical image and the normal image.

In one embodiment of the invention, determining a normal image from the plurality of synthesized images comprises determining the normal image as a particular synthesized image, of the plurality of synthesized images, that depicts a healthiest tissue.

In one embodiment of the invention, determining the normal image as a particular synthesized image, of the plurality of synthesized images, that depicts a healthiest tissue comprises determining the particular synthesized image as one of the plurality of synthesized images that maximizes a distance metric between the plurality of synthesized images and the input medical image.

In one embodiment of the invention, the operations further comprise training the trained generative adversarial network by receiving a multi-site dataset associated with different clinical sites and a deployment dataset associated with a deployment clinical site, training a deep convolutional generative adversarial network based on the multi-site dataset, and optimizing the trained deep convolutional generative adversarial network based on the deployment dataset to provide the trained generative adversarial network.

In one embodiment of the invention, the multi-site dataset comprises a first dataset and a second dataset, and training a deep convolutional generative adversarial network based on the multi-site dataset comprises reordering the second dataset based on a similarity of the first dataset and the second dataset, and determining the trained deep convolutional generative adversarial network based on a pretrained deep learning model and the reordered second dataset.

One embodiment of the invention is a method for training a deep learning model using a multi-site dataset is provided. The method comprises receiving a multi-site dataset associated with different clinical sites and a deployment dataset associated with a deployment clinical site, training a deep learning model based on the multi-site dataset, optimizing the trained deep learning model based on the deployment dataset, and outputting the optimized trained deep learning model.

In one embodiment of the invention, the multi-site dataset comprises a first dataset and a second dataset, the second dataset comprises a plurality of sub-datasets, and training a deep learning model based on the multi-site dataset comprises reordering the plurality of sub-datasets of the second dataset based on a similarity between the first dataset and each sub-dataset of the second dataset, and training the deep learning model based on 1) a pretrained deep learning model pretrained on the first dataset, and 2) the reordered plurality of sub-datasets of the second dataset.

In one embodiment of the invention, reordering the plurality of sub-datasets of the second dataset based on a similarity between the first dataset and each sub-dataset of the second dataset comprises determining the similarity between the first dataset and each sub-dataset of the second dataset based on a similarity measure.

In one embodiment of the invention, training the deep learning model based on 1) a pretrained deep learning model pretrained on the first dataset, and 2) the reordered plurality of sub-datasets of the second dataset comprises selectively and iteratively updating the pretrained deep learning model with particular sub-datasets of the reordered plurality of sub-datasets of the second dataset.

In one embodiment of the invention, selectively and iteratively updating the pretrained deep learning model with particular sub-datasets of the reordered plurality of sub-datasets of the second dataset comprises for each respective sub-dataset of the reordered plurality of sub-datasets, starting from a first sub-dataset to a last sub-dataset performing a first comparison between 1) a performance of the pretrained deep learning model updated with the respective sub-dataset and any prior sub-datasets during prior iterations, and 2) a performance of the pretrained deep learning model, performing a second comparison between 1) the performance of the pretrained deep learning model iteratively updated with the respective sub-dataset and any prior sub-datasets during prior iterations, and 2) a performance of a deep learning model trained on the first dataset and the second dataset, and updating the pretrained deep learning model using the respective sample based on the first comparison and the second comparison.

In one embodiment of the invention, the deployment dataset comprises a labeled dataset, and optimizing the trained deep learning model based on the deployment dataset comprises reordering the labeled dataset based on an uncertainty, and optimizing the trained deep learning model based on the reordered labeled dataset.

In one embodiment of the invention, optimizing the trained deep learning model based on the reordered labeled dataset comprises selectively and iteratively updating the trained deep learning model with particular samples of the reordered labeled dataset.

In one embodiment of the invention, selectively and iteratively updating the trained deep learning model with particular samples of the reordered labeled dataset comprises for each respective sample of the reordered labeled dataset, starting from a first sample to a last sample performing a first comparison between 1) a performance of the trained deep learning model updated with the respective sample and any prior samples during prior iterations, and 2) a performance of the trained deep learning model, performing a second comparison between 1) a performance of the trained deep learning model iteratively updated with the respective sample and any prior samples during prior iterations, and 2) a performance of a deep learning model trained on the labeled dataset, updating the trained deep learning model using the respective sample based on the first comparison and the second comparison.

In one embodiment of the invention, performing a first comparison between 1) a performance of the trained deep learning model updated with the respective sample and any samples during prior iterations, and 2) a performance of the trained deep learning model comprises performing the first comparison based on an error value.

One embodiment of the invention is an apparatus for training a deep learning model using a multi-site dataset. The apparatus comprises means for receiving a multi-site site dataset associated with different clinical sites and a deployment dataset associated with a deployment clinical site, means for training a deep learning model based on the multi-site dataset, means for optimizing the trained deep learning model based on the deployment dataset, and means for outputting the optimized trained deep learning model.

In one embodiment of the invention, the multi-site dataset comprises a first dataset and a second dataset, the second dataset comprises a plurality of sub-datasets, and the means for training a deep learning model based on the multi-site dataset comprises means for reordering the plurality of sub-datasets of the second dataset based on a similarity between the first dataset and each sub-dataset of the second dataset, and means for training the deep learning model based on 1) a pretrained deep learning model pretrained on the first dataset, and 2) the reordered plurality of sub-datasets of the second dataset.

In one embodiment of the invention, the means for reordering the plurality of sub-datasets of the second dataset based on a similarity between the first dataset and each sub-dataset of the second dataset comprises means for determining the similarity between the first dataset and each sub-dataset of the second dataset based on a similarity measure.

In one embodiment of the invention, the means for training the deep learning model based on 1) a pretrained deep learning model pretrained on the first dataset, and 2) the reordered plurality of sub-datasets of the second dataset comprises means for selectively and iteratively updating the pretrained deep learning model with particular sub-datasets of the reordered plurality of sub-datasets of the second dataset.

In one embodiment of the invention, the means for selectively and iteratively updating the pretrained deep learning model with particular sub-datasets of the reordered plurality of sub-datasets of the second dataset comprises for each respective sub-dataset of the reordered plurality of sub-datasets, starting from a first sub-dataset to a last sub-dataset means for performing a first comparison between 1) a performance of the pretrained deep learning model updated with the respective sub-dataset and any prior sub-datasets during prior iterations, and 2) a performance of the pretrained deep learning model, means for performing a second comparison between 1) the performance of the pretrained deep learning model iteratively updated with the respective sub-dataset and any prior sub-datasets during prior iterations, and 2) a performance of a deep learning model trained on the first dataset and the second dataset, and means for updating the pretrained deep learning model using the respective sample based on the first comparison and the second comparison.

One embodiment of the invention is a non-transitory computer readable medium storing computer program instructions for training a deep learning model using a multi-site dataset. The computer program instructions when executed by a processor cause the processor to perform operations comprising receiving a multi-site dataset associated with different clinical sites and a deployment dataset associated with a deployment clinical site, training a deep learning model based on the multi-site dataset, optimizing the trained deep learning model based on the deployment dataset, and outputting the optimized trained deep learning model.

In one embodiment of the invention, the multi-site dataset comprises a first dataset and a second dataset, the second dataset comprises a plurality of sub-datasets, and training a deep learning model based on the multi-site dataset comprises reordering the plurality of sub-datasets of the second dataset based on a similarity between the first dataset and each sub-dataset of the second dataset, and training the deep learning model based on 1) a pretrained deep learning model pretrained on the first dataset, and 2) the reordered plurality of sub-datasets of the second dataset.

In one embodiment of the invention, the deployment dataset comprises a labeled dataset, and optimizing the trained deep learning model based on the deployment dataset comprises reordering the labeled dataset based on an uncertainty, and optimizing the trained deep learning model based on the reordered labeled dataset.

In one embodiment of the invention, optimizing the trained deep learning model based on the reordered labeled dataset comprises selectively and iteratively updating the trained deep learning model with particular samples of the reordered labeled dataset.

In one embodiment of the invention, selectively and iteratively updating the trained deep learning model with particular samples of the reordered labeled dataset comprises for each respective sample of the reordered labeled dataset, starting from a first sample to a last sample performing a first comparison between 1) a performance of the trained deep learning model updated with the respective sample and any prior samples during prior iterations, and 2) a performance of the trained deep learning model, performing a second comparison between 1) a performance of the trained deep learning model iteratively updated with the respective sample and any prior samples during prior iterations, and 2) a performance of a deep learning model trained on the labeled dataset, updating the trained deep learning model using the respective sample based on the first comparison and the second comparison.

In one embodiment of the invention, performing a first comparison between 1) a performance of the trained deep learning model updated with the respective sample and any samples during prior iterations, and 2) a performance of the trained deep learning model comprises performing the first comparison based on an error value.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1, 5, and 8-12. Certain steps or functions of the methods and workflows described herein, including one or more of the steps or functions of FIGS. 1, 5, and 8-12, may be performed by a server or by another processor in a network-based cloud-computing system. Certain steps or functions of the methods and workflows described herein, including one or more of the steps of FIGS. 1, 5, and 8-12, may be performed by a client computer in a network-based cloud computing system. The steps or functions of the methods and workflows described herein, including one or more of the steps of FIGS. 1, 5, and 8-12, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1, 5, and 8-12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
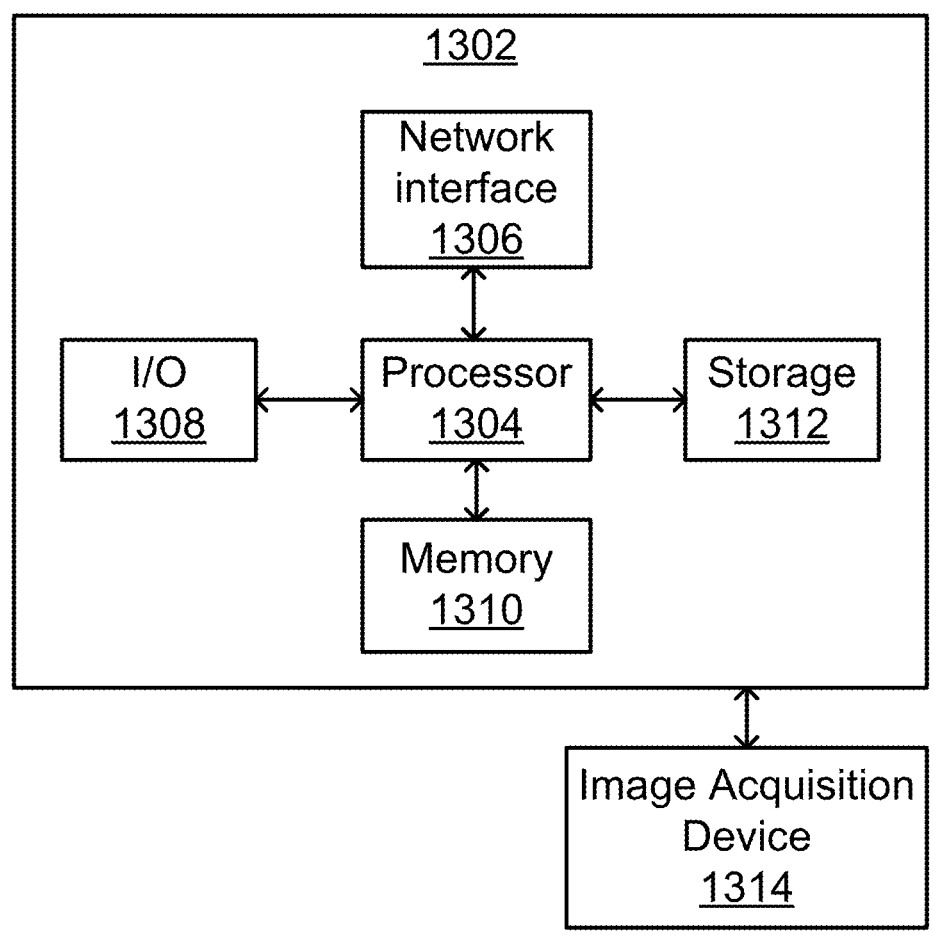
FIG. 13 shows a high-level block diagram of a computer.

A high-level block diagram of an example computer 1302 that may be used to implement systems, apparatus, and methods described herein is depicted in FIG. 13. Computer 1302 includes a processor 1304 operatively coupled to a data storage device 1312 and a memory 1310. Processor 1304 controls the overall operation of computer 1302 by executing computer program instructions that define such operations. The computer program instructions may be stored in data storage device 1312, or other computer readable medium, and loaded into memory 1310 when execution of the computer program instructions is desired. Thus, the method and workflow steps or functions of FIGS. 1, 5, and 8-12 can be defined by the computer program instructions stored in memory 1310 and/or data storage device 1312 and controlled by processor 1304 executing the computer program instructions. For example, the computer program instructions can be implemented as computer executable code programmed by one skilled in the art to perform the method and workflow steps or functions of FIGS. 1, 5, and 8-12. Accordingly, by executing the computer program instructions, the processor 1304 executes the method and workflow steps or functions of FIGS. 1, 5, and 8-12. Computer 1302 may also include one or more network interfaces 1306 for communicating with other devices via a network. Computer 1302 may also include one or more input/output devices 1308 that enable user interaction with computer 1302 (e.g., display, keyboard, mouse, speakers, buttons, etc.).

Processor 1304 may include both general and special purpose microprocessors, and may be the sole processor or one of multiple processors of computer 1302. Processor 1304 may include one or more central processing units (CPUs), for example. Processor 1304, data storage device 1312, and/or memory 1310 may include, be supplemented by, or incorporated in, one or more application-specific integrated circuits (ASICs) and/or one or more field programmable gate arrays (FPGAs).

Data storage device 1312 and memory 1310 each include a tangible non-transitory computer readable storage medium. Data storage device 1312, and memory 1310, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1308 may include peripherals, such as a printer, scanner, display screen, etc. For example, input/output devices 1308 may include a display device such as a cathode ray tube (CRT) or liquid crystal display (LCD) monitor for displaying information to the user, a keyboard, and a pointing device such as a mouse or a trackball by which the user can provide input to computer 1302.

An image acquisition device 1314 can be connected to the computer 1302 to input image data (e.g., medical images) to the computer 1302. It is possible to implement the image acquisition device 1314 and the computer 1302 as one device. It is also possible that the image acquisition device 1314 and the computer 1302 communicate wirelessly through a network. In a possible embodiment, the computer 1302 can be located remotely with respect to the image acquisition device 1314.

Any or all of the systems and apparatus discussed herein may be implemented using one or more computers such as computer 1302.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving a plurality of input medical images;
   localizing a lesion in each of the plurality of input medical images using a trained localization network;
   classifying the lesion in each of the plurality of input medical images based on the localizing, using a trained classification network, to generate a classification result for the lesion in each of the plurality of input medical images;
   combining the classification results; and
   outputting the combined classification results.

2. The method of claim 1, wherein the plurality of input medical images comprises images acquired with different acquisition protocols.

3. The method of claim 1, wherein the plurality of input medical images comprises x-ray images.

4. The method of claim 1, wherein the plurality of input medical images is preprocessed before the receiving.

5. The method of claim 4, wherein the plurality of input medical images is preprocessed by at least one of removing geometric variability in the plurality of input medical images or normalizing intensity variability in the plurality of input medical images.

6. The method of claim 1, wherein localizing a lesion in each of the plurality of input medical images using a trained localization network comprises:
   generating a localization map for each of the plurality of input medical images.

7. The method of claim 1, wherein the trained classification network comprises a neural network.

8. The method of claim 7, wherein inputs into an input layer of the neural network are based on outputs of the localization network.

9. The method of claim 1, wherein the combined classification results comprise an indication of malignancy.

10. The method of claim 1, further comprising:
    determining a lesion score.

11. The method of claim 10, wherein the lesion score comprises a PI-RADS (prostate imaging-reporting and data system) score.

12. The method of claim 1, wherein the trained localization network and the trained classification network are jointly trained.

13. The method of claim 1, wherein outputting the combined classification results comprises:
    displaying the combined classification results.

14. An apparatus comprising:
    means for receiving a plurality of input medical images;
    means for localizing a lesion in each of the plurality of input medical images;
    means for classifying the lesion in each of the plurality of input medical images based on the localizing to generate a classification result for the lesion in each of the plurality of input medical images;
    means for combining the classification results; and
    means for outputting the combined classification results.

15. The apparatus of claim 14, wherein the plurality of input medical images comprises images acquired with different acquisition protocols.

16. The apparatus of claim 14, wherein the plurality of input medical images comprises x-ray images.

17. The apparatus of claim 14, wherein localizing a lesion in each of the plurality of input medical images using a trained localization network comprises:

generating a localization map for each of the plurality of input medical images.

18. The apparatus of claim 14, wherein the combined classification results comprise an indication of malignancy.

19. The apparatus of claim 14, further comprising:

means for determining a lesion score.

20. The apparatus of claim 14, wherein:

the means for localizing a lesion in each of the plurality of input medical images comprises a trained localization network; and the means for classifying the lesion in each of the plurality of input medical images comprises a trained classification network.

21. The apparatus of claim 20, wherein the trained localization network and the trained classification network are jointly trained.

22. The apparatus of claim 14, wherein the means for outputting the combined classification results comprises:

means for displaying the combined classification results.

23. A non-transitory computer readable medium storing computer program instructions, the computer program instructions when executed by a processor cause the processor to perform operations comprising:

receiving a plurality of input medical images;

localizing a lesion in each of the plurality of input medical images using a trained localization network;

classifying the lesion in each of the plurality of input medical images based on the localizing, using a trained classification network, to generate a classification result for the lesion in each of the plurality of input medical images;

combining the classification results; and outputting the combined classification results.

24. The non-transitory computer readable medium of claim 23, wherein the plurality of input medical images comprises images acquired with different acquisition protocols.

25. The non-transitory computer readable medium of claim 23, wherein the plurality of input medical images comprises x-ray images.

26. The non-transitory computer readable medium of claim 23, wherein localizing a lesion in each of the plurality of input medical images using a trained localization network comprises:

generating a localization map for each of the plurality of input medical images.

27. The non-transitory computer readable medium of claim 23, wherein the combined classification results comprise an indication of malignancy.

28. The non-transitory computer readable medium of claim 23, the operations further comprising:

determining a lesion score.

29. The non-transitory computer readable medium of claim 23, wherein the trained localization network and the trained classification network are jointly trained.

30. The non-transitory computer readable medium of claim 23, wherein outputting the combined classification results comprises:

displaying the combined classification results.

\* \* \* \* \*